(12) United States Patent
Richards et al.

(10) Patent No.: US 11,410,448 B2
(45) Date of Patent: *Aug. 9, 2022

(54) PREDICTIVE ANALYSIS SYSTEMS AND METHODS USING MACHINE LEARNING

(71) Applicant: DeepSee.ai Inc., Salt Lake City, UT (US)

(72) Inventors: Wacey T. Richards, Midway, UT (US); Michael E. Kiemel, Lehi, UT (US); Stephen W. Shillingford, Salt Lake City, UT (US); Samuel Z. Shillingford, Salt Lake City, UT (US); Damon A. Darais, Pleasant Grove, UT (US); Joseph M. Wood, Broadlands, VA (US); Robert D. Bailey, Saratoga Springs, UT (US); Matthew Valley, American Fork, UT (US); Stewart A. Sintay, Lehi, UT (US)

(73) Assignee: DeepSee.ai Inc., Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,566

(22) Filed: Nov. 16, 2020

(65) Prior Publication Data

US 2021/0073536 A1 Mar. 11, 2021

Related U.S. Application Data

(63) Continuation of application No. 16/510,644, filed on Jul. 12, 2019, now Pat. No. 10,839,207.
(Continued)

(51) Int. Cl.
*G06K 9/00* (2022.01)
*G06V 30/416* (2022.01)
(Continued)

(52) U.S. Cl.
CPC .......... *G06V 30/416* (2022.01); *G06F 40/205* (2020.01); *G06K 9/6263* (2013.01); *G06N 20/00* (2019.01); *G06V 30/414* (2022.01)

(58) Field of Classification Search
None
See application file for complete search history.

(56) References Cited

U.S. PATENT DOCUMENTS 8,196,030 B1 * 6/2012 Wang ................. G06K 9/00442
715/200
8,880,446 B2 11/2014 Wellman
(Continued)

OTHER PUBLICATIONS

U.S. Appl. No. 16/510,644; Notice of Allowance dated Oct. 6, 2020, pp. 1-12.

*Primary Examiner* — Soo Jin Park
(74) *Attorney, Agent, or Firm* — Phillips Winchester; Justin K. Flanagan

(57) ABSTRACT

Systems and methods may utilize a predictive analysis model to analyze a contract or other document. A system may parse a document and/or a repository of information associated with the document. The system may identify one or more terms in the document and corresponding terms in the repository. The system may determine a difference parameter between a first term extracted from the document and a second term extracted from the repository. The system may determine whether the difference between the first term and the second term, represented by the difference parameter, is likely to be acceptable to the user using a predictive analysis model. The system may report a validation parameter indicating a level of acceptability associated with the difference. User feedback on the accuracy of the predictive analysis model is used to train, modify, and improve the predictive analysis model.

20 Claims, 21 Drawing Sheets

Related U.S. Application Data

(60) Provisional application No. 62/698,106, filed on Jul. 14, 2018.

(51) Int. Cl.
*G06N 20/00* (2019.01)
*G06K 9/62* (2022.01)
*G06F 40/205* (2020.01)
*G06V 30/414* (2022.01)

(56) References Cited

U.S. PATENT DOCUMENTS

| | | |
|---|---|---|
| 9,218,574 B2 | 12/2015 | Phillipps |
| 9,646,262 B2 | 5/2017 | Phillipps |
| 9,922,247 B2 * | 3/2018 | Khintsitskiy ...... G06K 9/00483 |
| 10,650,091 B2 * | 5/2020 | Riediger ............... G06F 16/313 |
| 10,839,207 B2 | 11/2020 | Wood et al. |
| 10,861,101 B1 * | 12/2020 | Harding ................ G06Q 40/08 |
| 2018/0018468 A1 | 1/2018 | Williams |
| 2018/0113676 A1 * | 4/2018 | De Sousa Webber ....................... G06F 40/279 |
| 2020/0026916 A1 | 1/2020 | Wood et al. |
| 2020/0067861 A1 * | 2/2020 | Leddy .................... H04L 51/12 |

\* cited by examiner

Deal Review Dashboard - Validation

1) Side-by-side comparison of PDF extracted data and XML data
2) Auto suggest a prediction by leveraging machine learning technology
3) Provide images that relate to the text extraction
4) Easily accept or reject Economic Parameters

| RYP Securitized CHECKLIST | PDF Details | XML Details | Prediction | Disposition | VIEW DOCUMENT |
|---|---|---|---|---|---|
| Prediction Results | PROGRESS | 12.6% | DEAL RYP-54631036 | | > |
| Sanity Checks | | | | Ⓐ | > |
| Issue Date - INS | December 31 2015 | NOT PRESENT | 2015-12-31 | Ⓥ | > |
| OTC instrument | | | | | > |
| Earliest Redemption Date - IMS | NOT PRESENT | NOT PRESENT | 2015-03-31 | Ⓡ | Date Correct |
| Note Instrument | | | | Ⓥ | > |
| Last Trading Date (Final Valuation Date) - IMS | NOT PRESENT | NOT PRESENT | 2018-12-21 | | |
| COTS vs Instruments | | | | Ⓡ | Doesn't Match |
| Redemption Frequency - IMS | NOT PRESENT | Quantity | | | |
| Test Price for Payment date | | | | Ⓐ | < |
| Denomination - IMS | Integral Multiples Thereof | 1000.0 | | | |
| Extra Comments | | | | | |
| PTP-S Matching | | | | Ⓥ | > |
| CUS/P/SN - IMS | 40128GFK1 | 40128GFK1 | | | |
| Underlying Description Section | Document Image | | | Ⓥ | > |
| | CUSIP: 48128GFK1 | | | Ⓥ | > |
| Relevance Level | | | | | |
| Variable Maturity - IMS | NOT PRESENT | USER TO LOOK UP ON PTRWS | | | |
| Flex Fields | Relevant Clearing System | NOT PRESENT | USER TO LOOK UP ON PTRWS | | |
| Group 2 TAO | Listing | NOT PRESENT | USER TO LOOK UP ON PTRWS | | |

FIG. 4A

| RYP Securitized CHECKLIST | PROGRESS | 0% | DEAL RYP-54631036 | | VIEW DOCUMENT |
|---|---|---|---|---|---|
| Prediction Results | | | | | View the Entire PDF |
| Sanity Checks | Sanity Checks | | | | |
| | General | | | | Make Dispositions |
| Extra Comments | Economic Parameter | Extracted Text | XML Data | System Auto Predicts | P Review Comments |
| Underlying Description Section | OTC instrument name | RainbowYenmanParam | RainbowYenmanParam | Ⓐ | > |
| Average in Dates | What is the coupon type? | PerfTypeDiaHiLoPerElem... | PerfTypeDiaHiLoPerElem... | Ⓐ | > |
| Equity Coupon Tab | What is the basket type? | NOT PRESENT | USER TO LOOK UP ON PTP/IMS | Ⓐ | > |
| Asset Basket Weights | OTC Multiplier: Analytics | 1 | 10 | Ⓐ | > |
| Barrier Data Tab | OTC Multiplier: Trade | 1 | 10 | Ⓐ | > |
| Last Performance Tab | OTC Multiplier: MTM | 1 | 10 | Ⓐ | > |
| Holiday Array Tab | Principal Protected | No | USER TO LOOK UP ON PTP/IMS | Ⓥ | > |
| Rainbow Yenman Param Inst 7 tab (Rx) | Principal Protected(%) | 0 | USER TO LOOK UP ON PTP/IMS | Ⓥ | > |
| | Approximate Loading Ticket? | No | USER TO LOOK UP ON PTP/IMS | Ⓥ | > |

WORKFLOW

Generate Audit Report

| Deal Name | Deal Uploaded | | | | | Report Generated | | | | |
|---|---|---|---|---|---|---|---|---|---|---|
| 593 RYP Securitized Te | Fri Dec 15 13:42:18 EST 2017 | | | | | Fri Dec 15 13:42:18 EST 2017 | | | | |
| PDF (Extracted Text) | XML Data | | | | | Economic Parameter | Asset Name | Disposition | Comment | Predicted | Override Prediction |
| Rainbow YenmanPara | Rainbow YenmanParam | | | | | OTC instrument name | General | ACCEPT | | N | N/A |
| PerfTypeDigHiLoPerEl | PerfTypeDigHiLoPerElementMaker | | | | | What is the coupon type? | General | ACCEPT | | N | N/A |
| NOT PRESENT | NOT PRESENT | | | | | What is the basket type? | General | ACCEPT | | N/A | N/A |
| | | 1 | | | | OTC Multiplier: Analytics | General | ACCEPT | | N | N/A |
| | | 1 | | | | OTC Multiplier: Trade | General | ACCEPT | | N | N/A |
| | | 1 | | | | OTC Multiplier: MTM | General | ACCEPT | | N | N/A |
| No | | | 0 | | | Principal Protected | General | ACCEPT | | N/A | N/A |
| | | | | NOT PRESENT | | Principal Protected(%) | General | ACCEPT | | N/A | N/A |
| No | | | | NOT PRESENT | | Approximate loading ticket? | General | ACCEPT | | N/A | N/A |
| NOT PRESENT | | | | NOT PRESENT | | Extra comments tab | General | ACCEPT | | N/A | N/A |
| NOT PRESENT | | | | NOT PRESENT | | Offline Physical Settlement | General | ACCEPT | | N/A | N/A |
| AAPL | | | | | | Underlying ticker | APPLE INC (USD) | ACCEPT | | N | N/A |
| DAL | | | | | | Underlying ticker | DELTA AIR LINE | ACCEPT | | N | N/A |
| HPQ | HPQ_HPE_SYN | | | | | Underlying ticker | HPQ_HPE_SYN | ACCEPT | | N | N/A |
| NOT PRESENT | USD | | | | | What is the National Currency? | APPLE INC (USD) | ACCEPT | | N/A | N/A |
| NOT PRESENT | USD | | | | | What is the National Currency? | DELTA AIR LINE | ACCEPT | | N/A | N/A |
| NOT PRESENT | USD | | | | | What is the National Currency? | HPQ_HPE_SYN | ACCEPT | | N/A | N/A |

FIG. 7B

PREDICTIVE ANALYSIS SYSTEMS AND METHODS USING MACHINE LEARNING

RELATED APPLICATIONS

This application is continuation of U.S. patent application Ser. No. 16/510,644, filed on Jul. 12, 2019, titled "Systems and Methods for Predictive Analysis Reporting," which claims priority to U.S. Provisional Patent No. 62/698,106, filed on Jul. 14, 2018, titled "Techniques for Predictive Analysis," both of which are hereby incorporated by reference in their entireties.

Many of the systems and methods described herein can be used in conjunction with and/or to augment the principles disclosed in: U.S. Pat. No. 8,880,446 filed on Apr. 25, 2013 and titled "Predictive Analytics Factory;" U.S. Pat. No. 9,218,574 filed on May 29, 2013 and titled "User Interface for Machine Learning;" and U.S. Pat. No. 9,646,262 filed on Apr. 30, 2014 and titled "Data Intelligence Using Machine Learning," each of which is hereby incorporated by reference in its entirety to the extent it is not inconsistent herewith.

BACKGROUND

The following relates generally to methods for reviewing documents, and more specifically to techniques for predictive analysis related to review of documents such as documentation for deals, contracts, and transactions. Before a deal is finalized, a party to the deal may review the terms and conditions to ensure they are correct. Reviewing deals can be a slow, complex process that may not identify all the errors in the terms and conditions.

BRIEF DESCRIPTION OF THE DRAWINGS

FIG. 4A illustrates an example of a screenshot of a user interface that supports techniques for predictive analysis, according to one embodiment.

FIG. 5 illustrates an example of a screenshot of a user interface that supports techniques for predictive analysis, according to one embodiment.

FIG. 7B illustrates an example screenshot of an audit report that may be made available from a user dashboard, according to one embodiment.

DETAILED DESCRIPTION

A process flow of a system may illustrate procedures for performing a deal review using predictive analysis. Many contract negotiations and deals include validation and checking of contract terms. Such validation and checking may be desirable so parties can identify errors in the agreement, malfeasance by an opposing party, and/or ensure that the documentation for the deal meets the risk profile of each of the parties to the agreement.

Techniques are described herein for using predictive analysis to analyze a contract document that is part of a deal. One or more devices (e.g., an application server and/or a user portal) may receive and parse one or more contract documents that are part of the deal and receive and parse a repository of information about the deal that is unique to one or more of the parties. The one or more devices may identify one or more contract terms in the contract document and the repository. The one or more devices may determine a difference parameter between a first contract term extracted from the contract document and a second contract term extracted from the repository. The one or more devices may determine whether the difference between the first contract term and the second contract term represented by the difference parameter is quantitatively "likely" to be acceptable to the user using a predictive analysis system. A validation parameter may indicate a quantified level of acceptability of the difference. The user may review and may manually validate the validation parameter. Over time, machine learning may use the user's review to modify (e.g., improve) the accuracy of the validation parameter based on a history of user(s) accepting or rejecting the difference between terms or phrases.

Aspects of the disclosure are described in the context of a process flow for deal review, screenshots of a user interface, and workflows. Aspects of the disclosure are further illustrated by and described with reference to an apparatus diagram, a system diagram, and a flowchart that relate to techniques for predictive analysis.

Figure 1A:
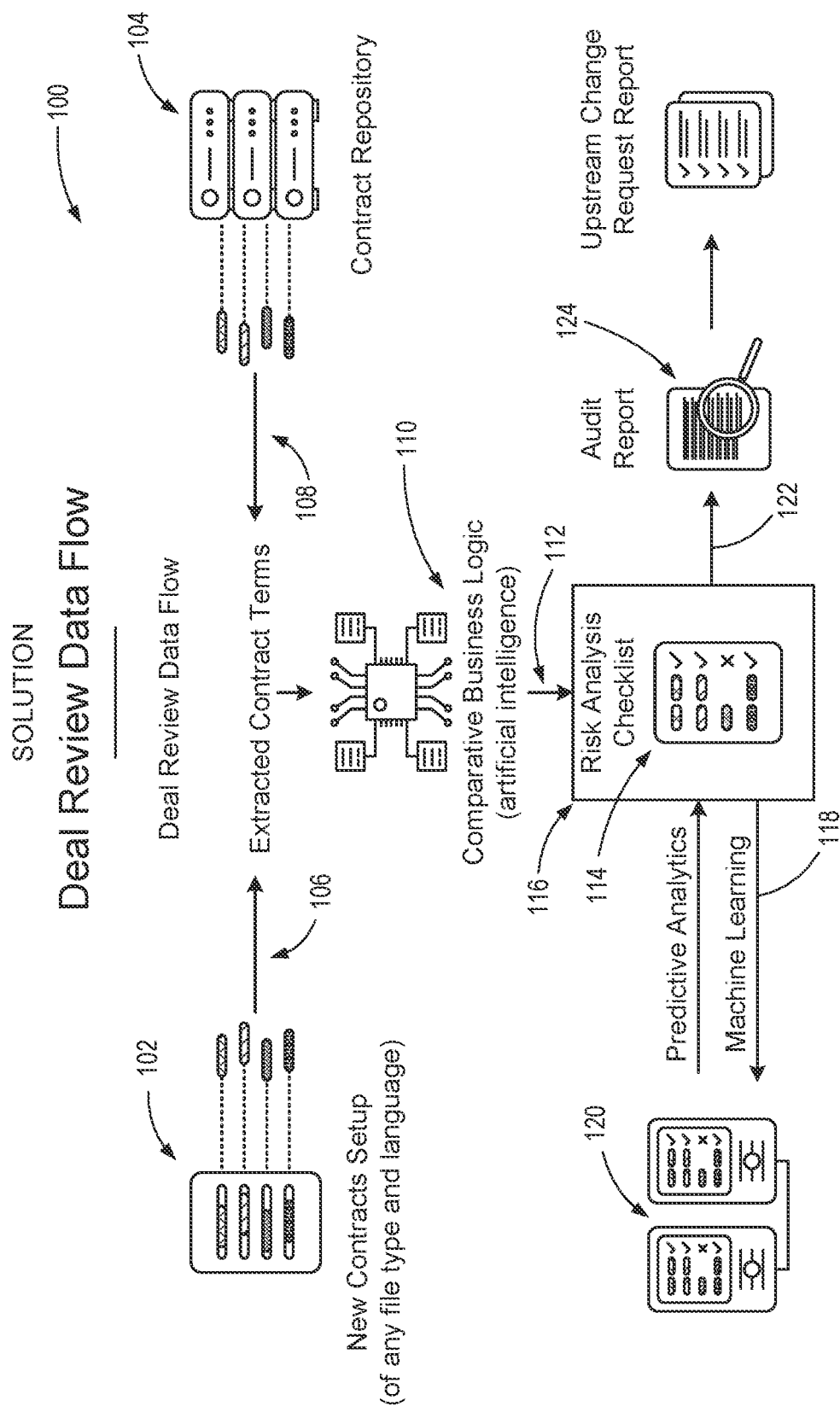
FIG. 1A illustrates an example of a process flow for deal review that supports techniques for predictive analysis, according to one embodiment.

FIG. 1A illustrates an example of a process flow 100 for deal review that supports techniques for predictive analysis in accordance with aspects of the present disclosure. The process flow 100 may be performed by an application server, a user portal, and/or other computing devices. The application server may be an example of a server. The user portal may be an example of any of a wide variety of electronic devices that interact with the user. Examples of the user portal may include a personal computer, a laptop, a tablet, a smartphone, and/or another computing device. The process flow 100 may be executed by applications on the application server and the user portal. In some cases, the application(s) may be self-contained on each device. In some cases, the application(s) may be distributed across multiple devices (e.g., application server and/or user portal).

One or more devices (e.g., an application server and/or a user portal) may be configured to receive a plurality of documents as part of the process flow 100. For example, a user may upload a contract document 102 to a user portal. The user portal may then communicate the contract document 102 to an application server. The contract document 102 may be an example of a document that recites terms and conditions of the agreement, the parties to the agreement, and/or other information. The contract document 102 may be in any file format. For example, the contract document 102 may be a portable data format (PDF) document, a Microsoft Word document, and/or some other document format. The contract document 102 may include terms that are the result of negotiations between two parties.

The user may also allow the application server to access a repository 104 of contract terms. The repository 104 may include contract terms as specified by one of the parties. The repository 104 may be stored on a server or a database. The repository 104 may be XML data. The repository 104 may include information that is specific to the contract negotiation associated with the contract document 102. In some cases, the repository 104 may include contract terms that may apply to a plurality of different deals or contract negotiations. The repository 104 may include contract terms as proposed by one party or contract terms as the party thinks they should be. In some cases, the repository 104 may include transactional confirmations.

At 106, the one or more devices may parse the contract document 102 (e.g., PDF document) to extract one or more contract terms in the contract document 102. As part of the extraction, the contract document 102 may be segmented into one or more segments.

At 108, the one or more devices may parse the repository 104 (e.g., XML data) to extract one or more contract terms in the repository 104. As part of the extraction, the repository 104 may be segmented into one or more segments.

The contract terms extracted from the contract document 102 and/or the repository 104 may be any item of interest in a contract. Examples of the contract terms may include the identity of the parties, entity types of the parties, addresses of the parties, purpose(s) of the contract, assumptions underlying the agreement, general contract terms, duties of each party, rights of each party, relevant dates, relevant prices or other dollar amounts, relevant quantities, payment terms, payment plans (e.g., lump sum or installments), payment due dates, tax implications, interest, late fees, warranties, disclaimers, limitations on liability, liquidated damages, confidentiality provisions, indemnification provisions, default provisions, an arbitration clause, provisions about governing law, venue of lawsuits involving the contract, statement that a contract constitutes an entire agreement, severability of individual provisions, signatures of authorized signatories, or other information, or a combination thereof.

At 110, the one or more devices may apply comparative logic to compare the contract terms extracted from the contract document 102 (e.g., the negotiated terms) and the contract terms extracted from the repository 104 (e.g., the terms associated with one party). In some cases, the comparative logic may be an example of artificial intelligence. The comparative logic may be configured to compare a negotiated contract term (e.g., found in the contract document 102) to an intended contract term (e.g., found in the repository 104). Any two contract terms, however, cannot be compared and yield useful information. For the comparison to be more useful, contract terms over the similar or identical subject matter should be compared. For example, a price for an item in the contract document 102 should be compared to a price for the item in the repository 104. In another example, the execution date of the deal found in the contract document 102 should be compared to the execution date of the deal found in the repository 104.

In some cases, at 110, the one or more devices may categorize the contract terms extracted from either the contract document 102 or the repository 104. The categories may allow the device(s) to group contract terms. The one or more devices may correlate contract terms extracted from the contract document 102 with contract terms extracted from the repository 104. A contract term extracted from the contract document 102 may be correlated with or mapped to or paired with a contract term extracted from the repository 104. In some cases, the mapping between contract terms extracted from the contract document 102 and contract terms extracted from the repository 104 is one-to-one. In some cases, the mapping is multiple-to-one, one-to-multiple, or multiple-to-multiple.

At 110, the one or more devices may determine at least one difference between at least one contract term extracted from the contract document 102 and at least one contract term extracted from the repository 104. In some cases, the at least one difference may be identified between correlated or mapped contract terms. The one or more devices may determine a difference parameter associated with the at least one contract term extracted from the contract document 102 and the at least one contract term extracted from the repository 104. The difference parameter may indicate a substantive difference between contract terms and may be different than any difference between terms. For example, the contract document 102 may list the execution date as Jul. 4, 2018 and the repository 104 may list the execution date as 4 Jul. 2018. In such examples, the difference parameter may indicate that the contract terms are highly similar or identical even though a technical difference exists between the two provisions.

To determine a difference parameter between each pair of compared contract terms, the devices may apply validation criteria to the compared contract terms. Validation criteria may include rules applied when comparing contract terms. Validation criteria may be organized into one or more sets of validation criteria. A set of validation criteria may be defined for a specific type of agreement. That way, a user may improve the comparative logic by applying a set of validation criteria defined for a specific type of agreement.

The validation criteria may also be used to determine a validation parameter associated with compared contract terms. The validation parameter may indicate a predicted likelihood that the compared contract terms are acceptable to the party. In some cases, the one or more devices may determine a validation criterion from a set of validation criteria to apply to the difference parameter, the first contract term extracted from the contract document 102, and/or the second contract term extracted from the repository 104. The one or more devices may apply the validation criterion to the difference parameter, the first contract term extracted from the contract document 102, and/or the second contract term extracted from the repository 104. wherein determining whether the difference parameter satisfies the threshold is based at least in part on applying the validation criterion.

At 110, the one or more devices may determine whether the difference parameter satisfies one or more thresholds. The thresholds may be configured to indicate levels of acceptability of the difference between compared contract terms to the party to the deal. The thresholds may be used to determine whether the contract term extracted from the contract document 102 is likely acceptable to the party, the contract term extracted from the contract document 102 will need to be validated by a user associated with the party, the contract term extracted from the contract document 102 is likely to be rejected by the party, or whether no prediction for the contract term extracted from the contract document 102 can be made. Each of these determinations may be based on the difference parameter between the compared terms.

The validation parameter may indicate which of those thresholds was satisfied. For example, the validation parameter may indicate that contract term extracted from the contract document 102 is likely to be accepted, likely to be rejected, likely needs to be validated by a user, and/or no prediction can be made at this time. The validation parameter may be determined using a predictive analysis.

To generate the validation parameter and/or compare the difference parameters to the thresholds, the device(s) may apply a predictive analysis. The predictive analysis may be applied to the compared contract terms extracted from the contract document 102 and the repository 104, the differences between the compared contract terms, the difference parameter associated with the compared contract terms, or a combination thereof. In some cases, the predictive analysis may include comparing the difference parameter to one or more difference parameters of validated contract terms stored in a database. Such cases may be examples of leveraging. In some cases, the predictive analysis may include performing one or more risk evaluations on the compared contract terms, the differences between the compared contract terms, and/or the difference parameter associated with the compared contract terms.

In some cases, the device(s) may perform one or more leveraging procedures to determine the validation parameter. In the leveraging procedure, the one or more devices may search a database of validated contract terms to identify a highly similar or identical situation as represented by the compared contract terms. The one or more devices may identify that a second difference parameter between validated contract terms is similar to the difference parameter between the first contract term and the second contract term, where the second difference parameter is selected from a database of past validated contract terms. The one or more device may also identify a second validation parameter associated with the second difference parameter and may determine the validation parameter using the predictive analysis is based at least in part on identifying the second validation parameter associated with the second difference parameter.

In some cases, one or more devices may generate a confidence score associated with the validation parameter. The confidence score may indicate how confident the predictive analysis is that the user will accept the predicted validation parameter without modifying it. In some cases, the confidence score may be a percentage indicating a surety. The confidence score associated with the validation parameter generated using the predictive analysis may indicate a likelihood that the validation parameter is correct for the difference parameter between the compared contract terms extracted from the contract document 102 and the repository 104.

At 112, the one or more devices may request feedback from the user regarding the validation parameter and/or the compared contract terms. To request the feedback, the one or more devices may output information through a user interface 114 to a user portal 116. The information output through the user interface 114 may include the contract term(s) extracted from the contract document 102, the contract term(s) extracted from the repository 104, validation parameter(s), confidence score(s), or disposition parameter(s), or a combination thereof.

In some cases, before outputting the information, the one or more devices may normalize the contract terms extracted from the contract document 102 and/or the repository 104. In some cases, the information included in one or more of these documents may be in a format that is not ideal for a comparison. For example, relevant information about a specific contract term may be scattered through a broad range of language in the contract document 102. In another example, relevant information about a specific contract term may be in formats that are either not readable by the user or are in formats that are not ideal to be read by the user. For instance, the repository may store some information in a string that may be more readily readable by a user in a table format. The one or more devices may normalize or format the data before it is output. For example, the one or more devices may condense relevant contract terms and omit unnecessary language. In another example, the one or more devices may put information in a table. The one or more device may use one or more validation criteria to determine what type of normalization or formatting may be applied to which contract terms extracted from the contract document 102 and/or the repository 104.

The user portal 116 may receive feedback from the user about the validation parameters. The user may accept the validation parameter generated using the predictive analysis. The user may reject the validation parameter generated using the predictive analysis. When the predicted validation parameter is rejected, the user may enter a new validation parameter or may modify the validation parameter. Once the user has provided feedback on a compared set of contract terms and/or a validation parameter, a disposition parameter may indicate that the contract terms have been reviewed and approved by a user. In some cases, the user may enter one or more comments regarding the compared contract terms, the validation parameter, the difference parameter, or a combination thereof.

At 118, the one or more devices may perform machine learning using the predicted validation parameters and the feedback received from the user. To perform the machine learning, the one or more devices may store the compared contract terms, the difference parameter between the compared contract terms, the validation parameter, and/or the feedback from the user in a database 120. From this database of previously validated contract terms, the one or more devices may fine tune or adjust the predictive analysis used to generate predictive validation parameters. The one or more devices may perform machine learning on information stored in the database to adjust results of the predictive analysis. The one or more devices 118 may feedback the information collected using machine learning so that the predictive analysis performed at 110 may be more robust.

At 122, the one or more devices may generate a report 124 that includes information about the deal review. The report 124 may be generated after a user has reviewed at least some of the compared contract terms and their associated parameters. The report 124 may include the contract term(s) extracted from the contract document 102, the contract term(s) extracted from the repository 104, validation parameter(s), confidence score(s), or disposition parameter(s), or a combination thereof. In some cases, the report 124 may be a document (e.g., a PDF document). In some cases, the report 124 may be output using the user interface 114.

Figure 1B:
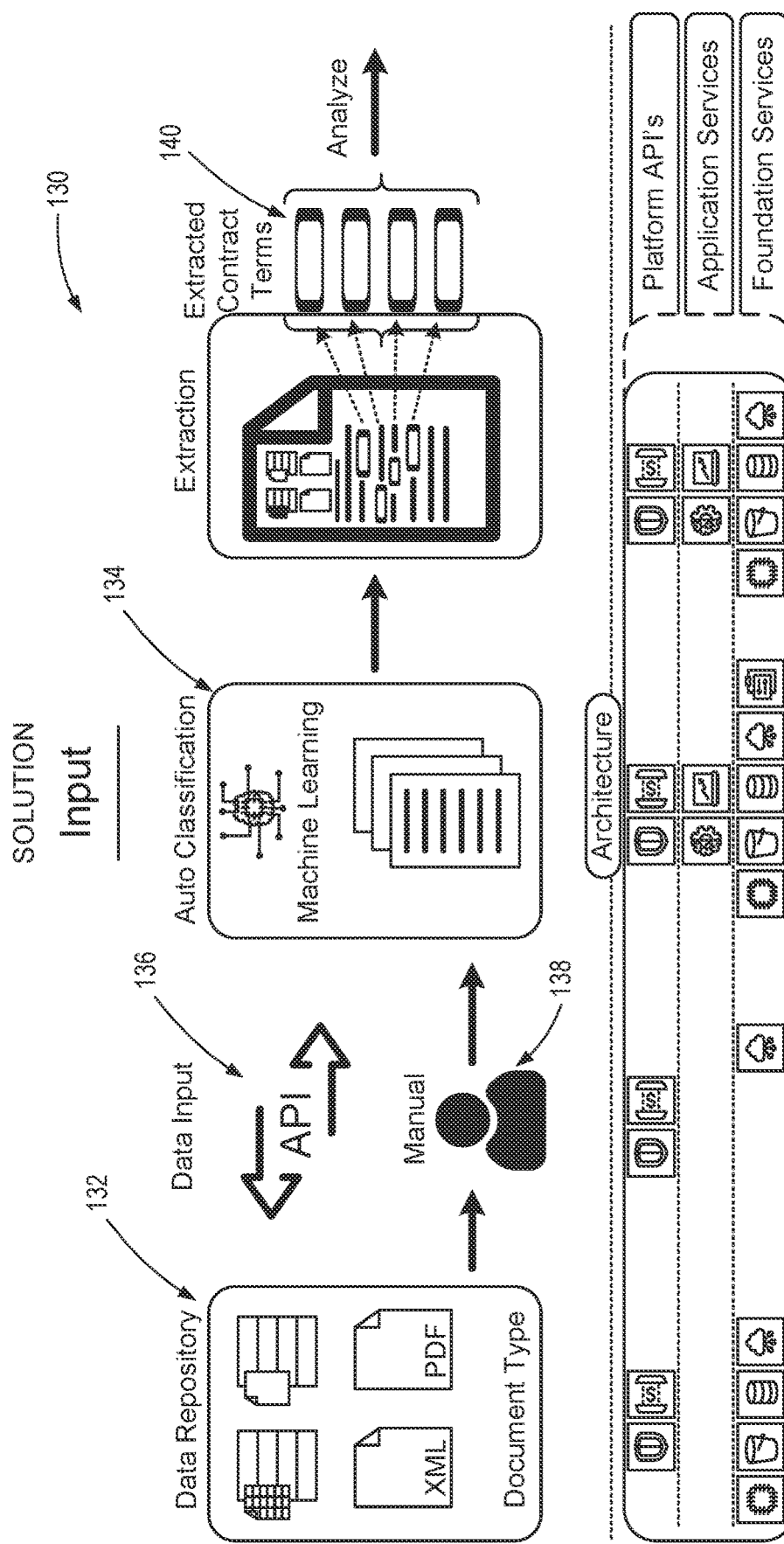
FIG. 1B illustrates an example contract document input subsystem where various formats of contract documents may be received and processed (i.e., ingested), be classified, and/or have contract terms extracted, according to one embodiment.

FIG. 1B illustrates an example contract document input subsystem 130 where various formats of contract documents may be ingested (i.e., processed and/or received), be classified, and/or have contract terms extracted. A data repository 132 may hold a plurality of contract documents. The format of a contract document may be any one of a plurality of document formats. In some examples, a contract document may be input into an auto-classification subsystem 134 via an application programming interface (API) 136 and/or a manual process 138. In this example, the auto-classification subsystem 134 may be implemented using machine learning and/or other artificial intelligence techniques. Classified contract documents may have a plurality of contract terms 140 extracted from them for analysis.

Figure 1C:
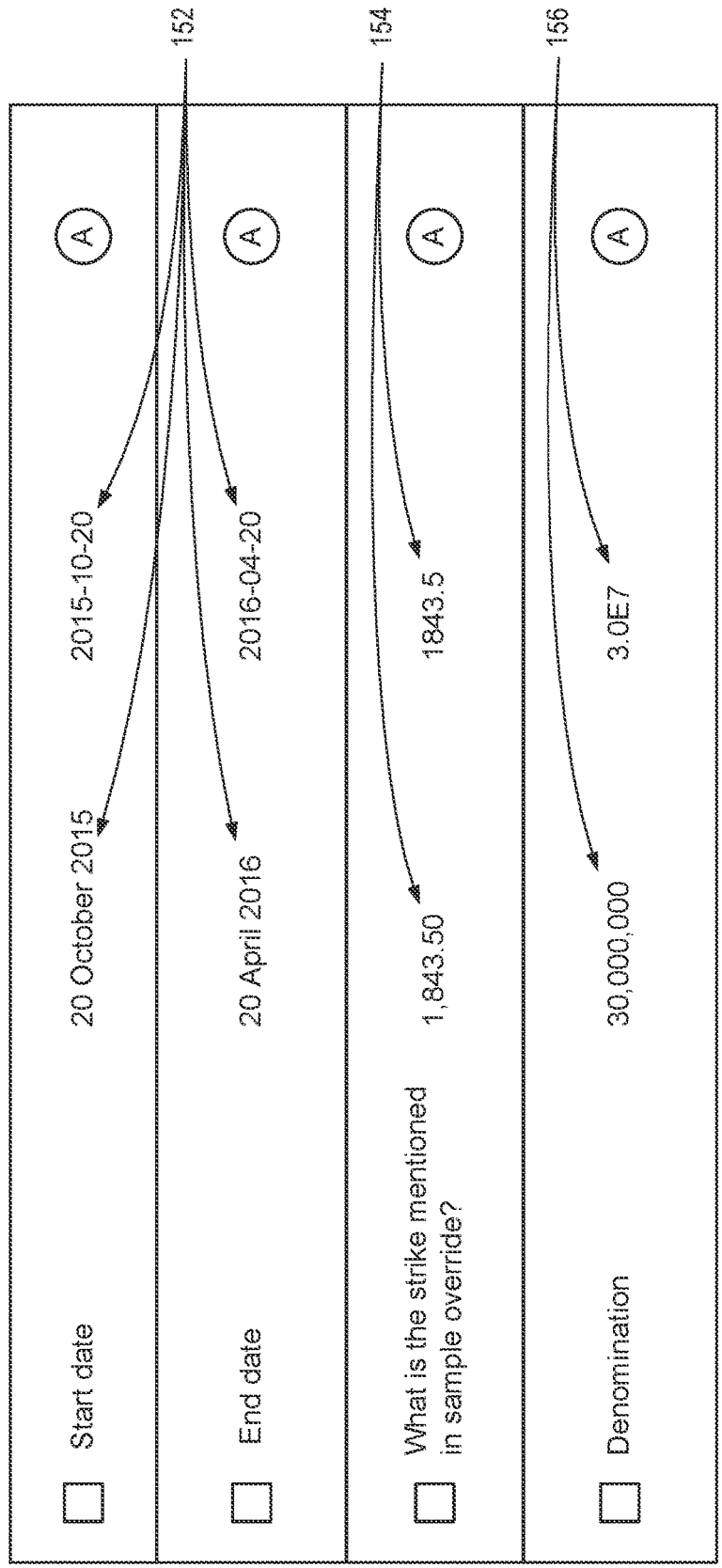
FIG. 1C illustrates an example screenshot of normalized contract terms, according to one embodiment.

FIG. 1C illustrates an example screenshot of normalized contract terms 150. In some examples, one or more devices may normalize the contract terms extracted from the contract document 102 and/or the repository 104 from FIG. 1A. In some examples, the information included in one or more of these documents may be in a format that is not ideal for a comparison. For example, relevant information about a specific contract term may be scattered through a broad range of language in the contract document 102 of FIG. 1A. In another example, relevant information about a specific contract term may be in formats that are either not readable by the user or are in formats that are not ideal to be read by the user. For instance, the repository may store some information in a string that may be more readily readable by a user in a table format. The one or more devices may normalize or format the data before it is output. For example, the one or more devices may condense relevant contract terms and omit unnecessary language. In another example, the one or more devices may put information in a table. The one or more devices may use one or more validation criteria to determine what type of normalization or formatting may be applied to which contract terms extracted from the contract document 102 and/or the repository 104 from FIG. 1A.

In some examples, contract terms comprise dates 152, currency values 154, abbreviations, numbers 156, character strings, and/or addresses. In some examples, contract terms may include metadata comprising font type, font size, and/or color. In some examples, contract terms may be normalized, e.g., converted to a selected date format 152, currency 154, acceptable abbreviation, number format 156, address format, font size, font type, and/or color.

Figure 2A:
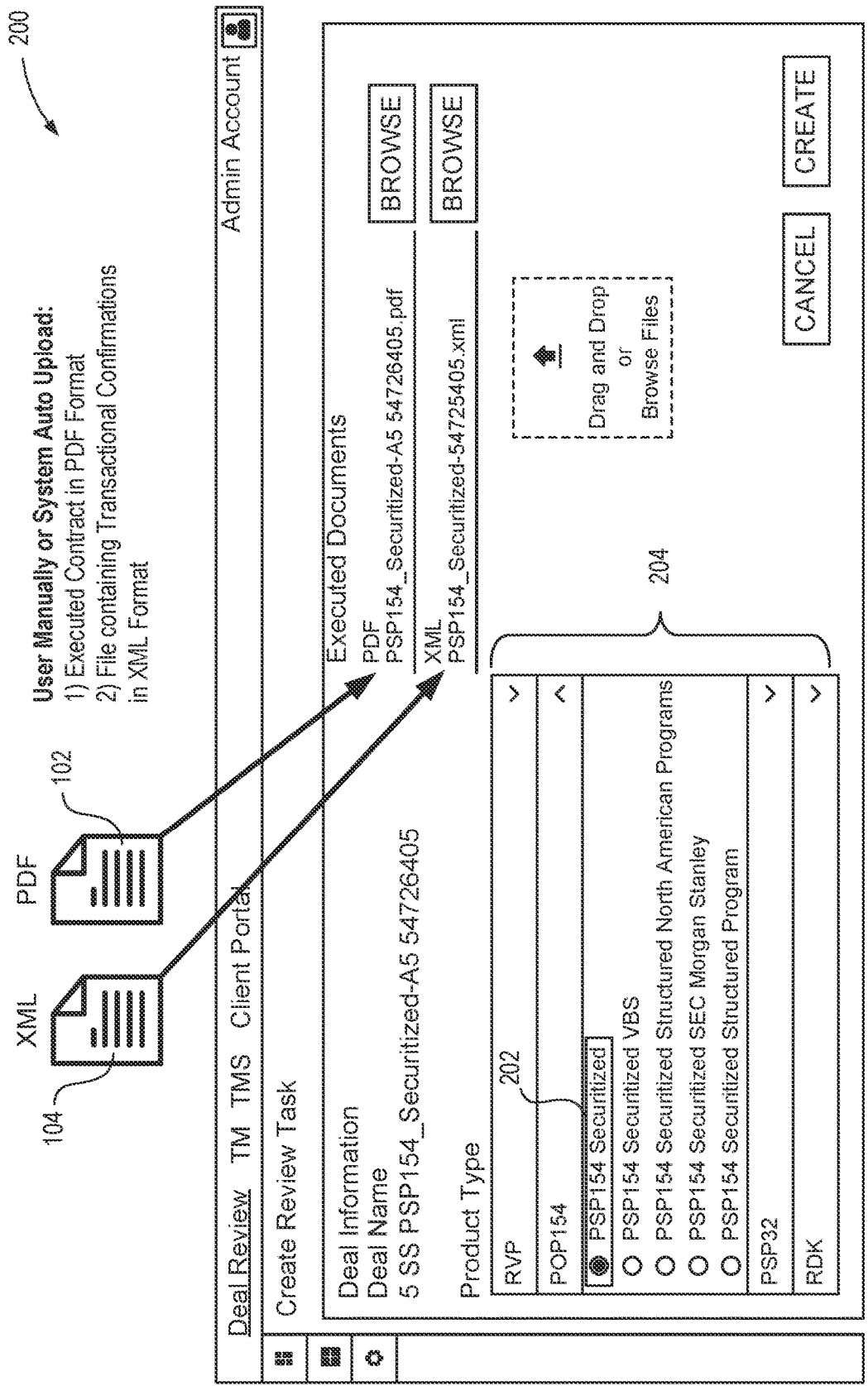
FIG. 2A illustrates an example of a screenshot of a user interface that supports techniques for predictive analysis, according to one embodiment.

FIG. 2A illustrates an example of a screenshot 200 of a user interface that supports techniques for predictive analysis in accordance with aspects of the present disclosure. The screenshot 200 may be an example of an output of the user interface 114 described with reference to FIG. 1.

The screenshot 200 may illustrate a user interface that may be used to upload the contract document 102 and the repository 104 to the one or more devices. In addition, the screenshot 200 illustrates selecting a set of validation criteria 202 from a plurality of sets of validation criteria 204. The user may interact with the user interface at a user portal such as a personal computer, laptop, tablet, smartphone, or another computing device.

Figure 2B:
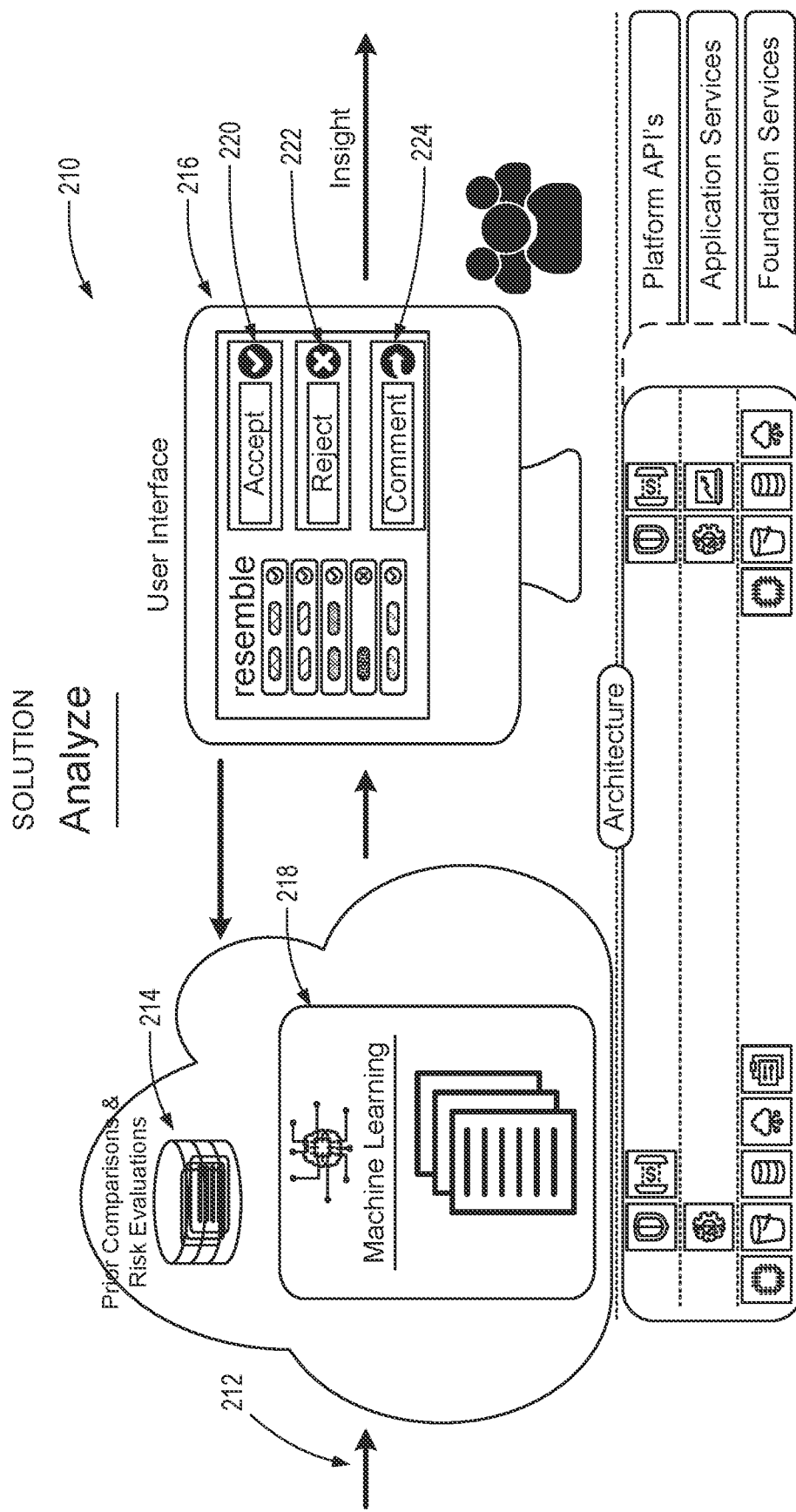
FIG. 2B illustrates an example of a deal analysis subsystem utilizing machine learning, according to one embodiment.

FIG. 2B illustrates an example of a deal analysis subsystem 210 utilizing machine learning. In this example, the deal analysis subsystem 210 compares contract terms 212 to prior contract terms, comparison data, and/or risk evaluations 214 and displays results on a user interface 216. In some examples, a machine learning subsystem 218 prompts a user to accept 220, reject 222, and/or comment 224 on a comparison outcome.

Figure 3A:
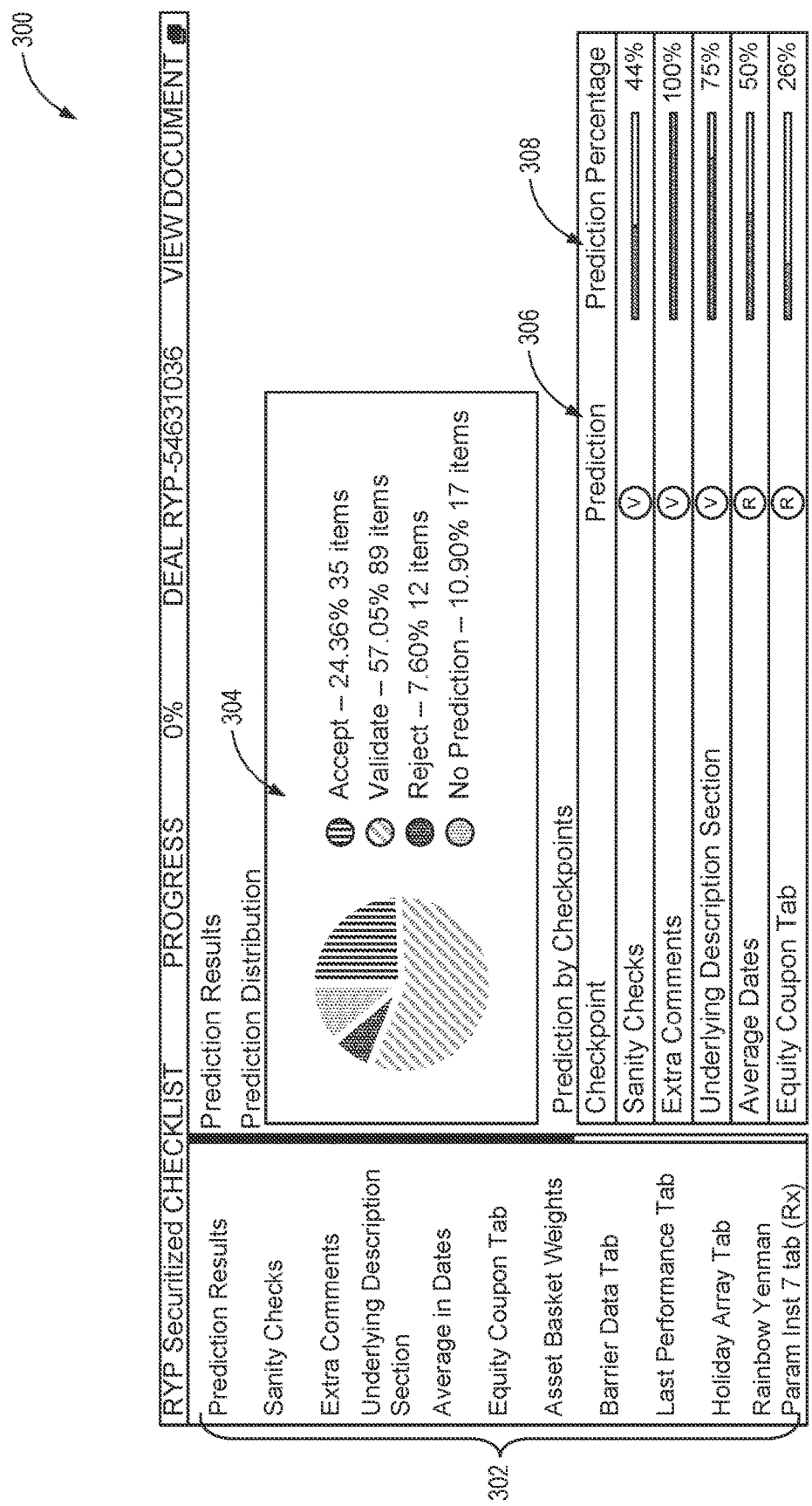
FIG. 3A illustrates an example of a screenshot of a user interface that supports techniques for predictive analysis according to one embodiment.

FIG. 3A illustrates an example of a screenshot 300 of a user interface that supports techniques for predictive analysis in accordance with aspects of the present disclosure. The screenshot 300 may be an example of an output of the user interface 114 described with reference to FIG. 1.

The screenshot 300 may illustrate a user interface that may be used to show a summary of the comparative analysis performed by the one or more devices. After the predictive validation parameters have been determined, the user interface may provide a summary of the prediction results.

The screenshot 300 may illustrate a plurality of validation criterion 302 applied to the compared contract terms. The validation criterion 302 may be individually selectable thereby allowing the user to navigate through the validation criterion 302 and see more information. The validation criterion 302 shown may illustrate groups of validation criterion that are part of a set of validation criteria.

The screenshot 300 may illustrate a distribution 304 of validation parameters determined using the predictive analysis. The individual validation parameters 306 may be shown in another part of the screenshot 300. The confidence score 308 associated with each validation parameter may also be shown in the screenshot.

Figure 3B:
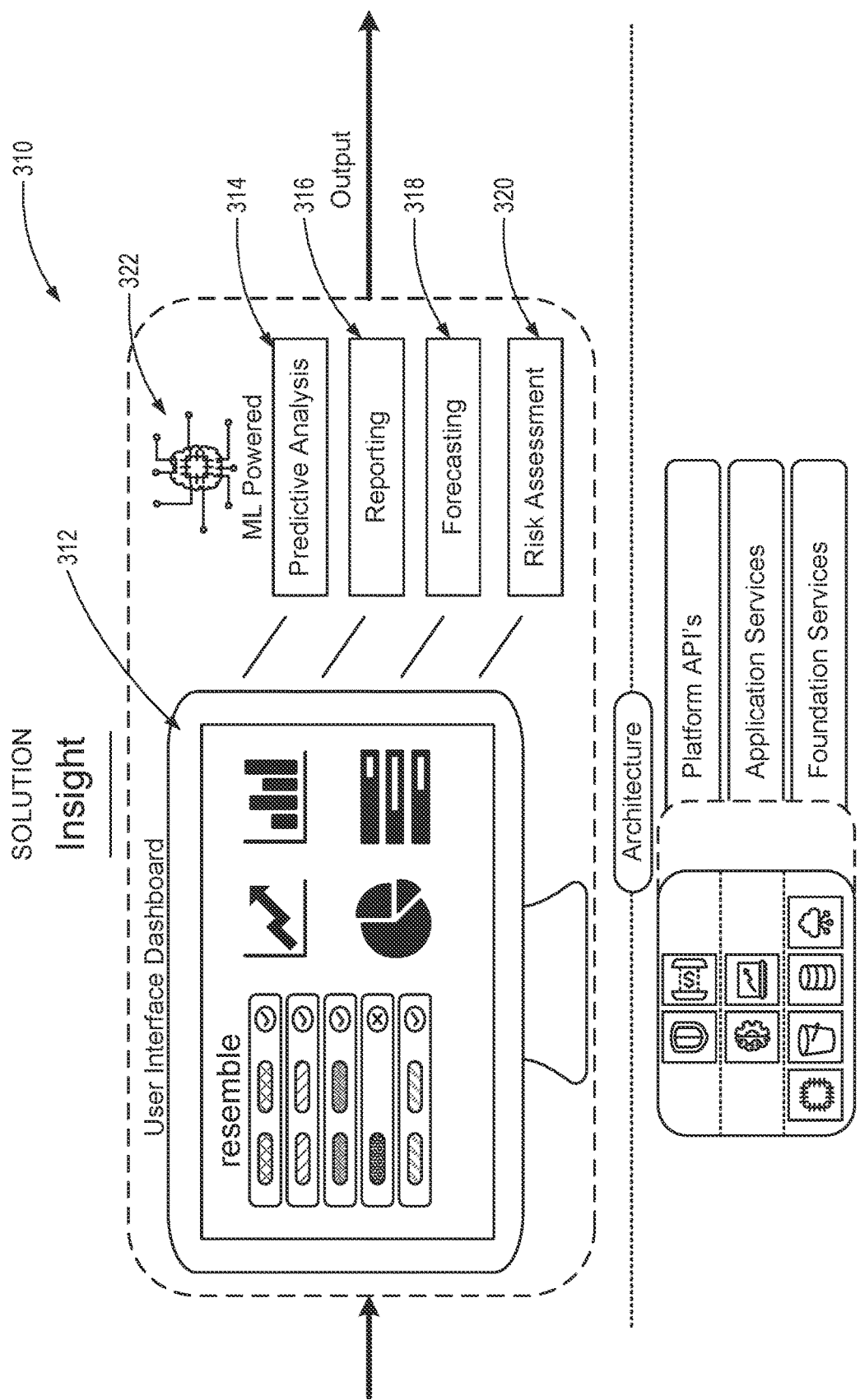
FIG. 3B illustrates an example of a deal insight subsystem utilizing machine learning, according to one embodiment.

FIG. 3B illustrates an example of a deal insight subsystem 310 utilizing machine learning. In some examples, there is a user interface dashboard 312 where a user may select to perform predictive analysis 314, reporting 316, forecasting 318, and/or risk assessment 320. In some examples, contract terms, analyzed data, and/or user input may be processed and/or presented on a user interface dashboard 312. In some examples, machine learning 322 and/or other forms of artificial intelligence may be used to assist a user in selecting an activity comprising predictive analysis 314, reporting 316, forecasting 318, and/or risk assessment 320.

FIG. 4A illustrates an example of a screenshot 400 of a user interface that supports techniques for predictive analysis in accordance with aspects of the present disclosure. The screenshot 400 may be an example of an output of the user interface 114 described with reference to FIG. 1.

The screenshot 400 may illustrate a deal review dashboard or at least a portion thereof. The screenshot may show a side-by-side comparison 402 of compared contract terms extracted from the contract document 102 and the repository 104. The side-by-side comparison 402 may allow a user to quickly validate the data and/or validate the predicated validation parameter without having to enter the individual documents. In some cases, the screenshot may include expandable items that show the text extracted from the various sources. The screenshot 400 may show the contract terms extracted from the contract document 102 at 404, the contract terms extracted from the repository 104 at 406, the validation parameters determined using the predictive analysis at 408, a disposition parameter indicating whether the user has reviewed/approved of the compared contract terms at 410, and/or comments entered by the user at 412. The user interface may also allow the user to dynamically accept or reject a set of compared contract terms.

Figure 4B:
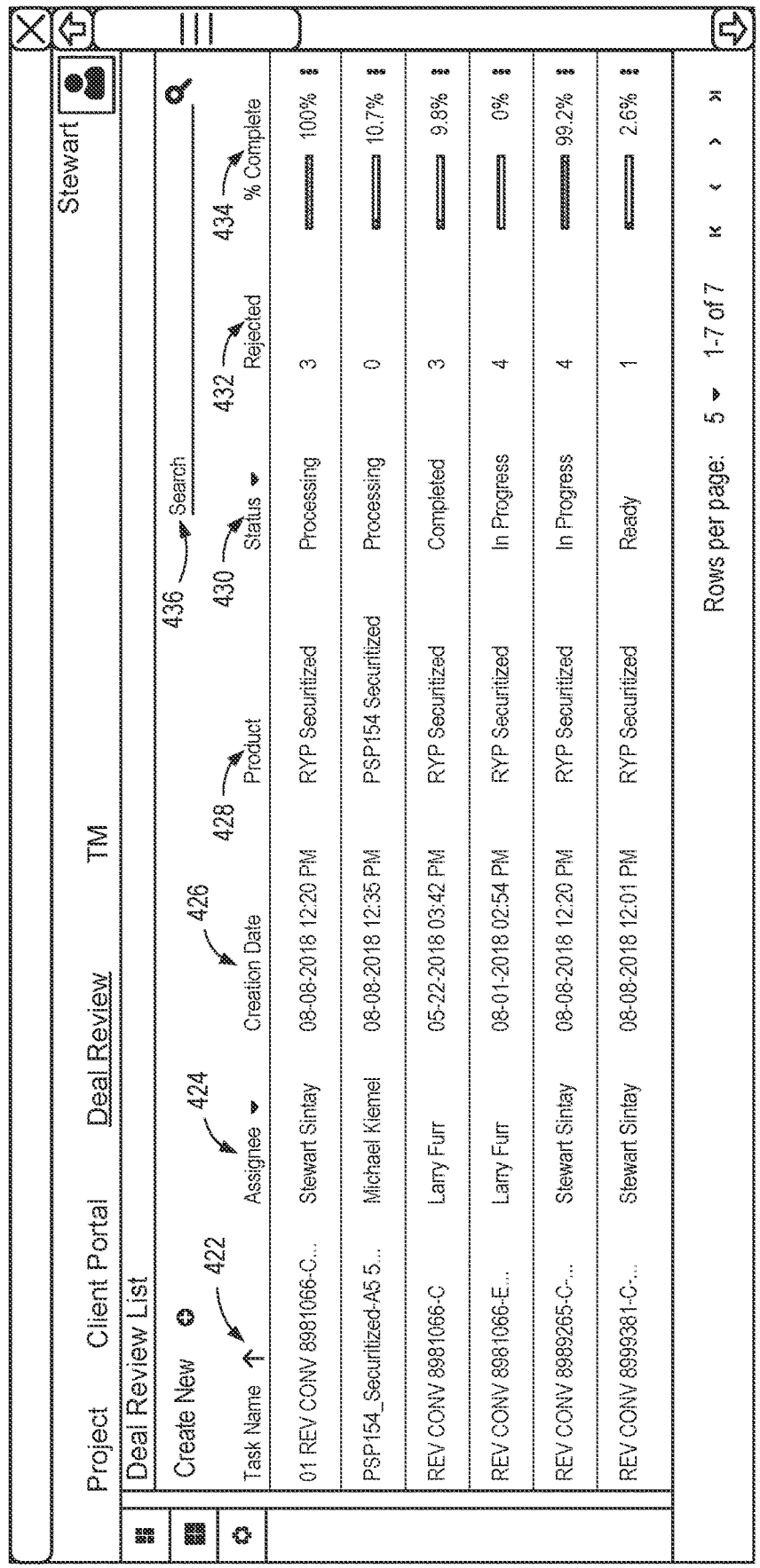
FIG. 4B illustrates an example screenshot of a deal review list, according to one embodiment.

FIG. 4B illustrates an example screenshot of a deal review list 420 comprising task name 422, assignee 424, creation date 426, product 428, status 430, rejected 432, and/or percentage complete 434. In some examples, a deal review list 420 may allow a user to quickly evaluate the status of each deal. The deal review list 420 may allow a user to identify tasks that need to be completed and/or identify who is responsible for completing them. In some examples, a deal review list 420 may include expandable items that show the text extracted from the various sources. In some examples, a deal review list 420 may have a search function 436 that facilitates finding a specific deal and/or a set of deals.

Figure 4C:
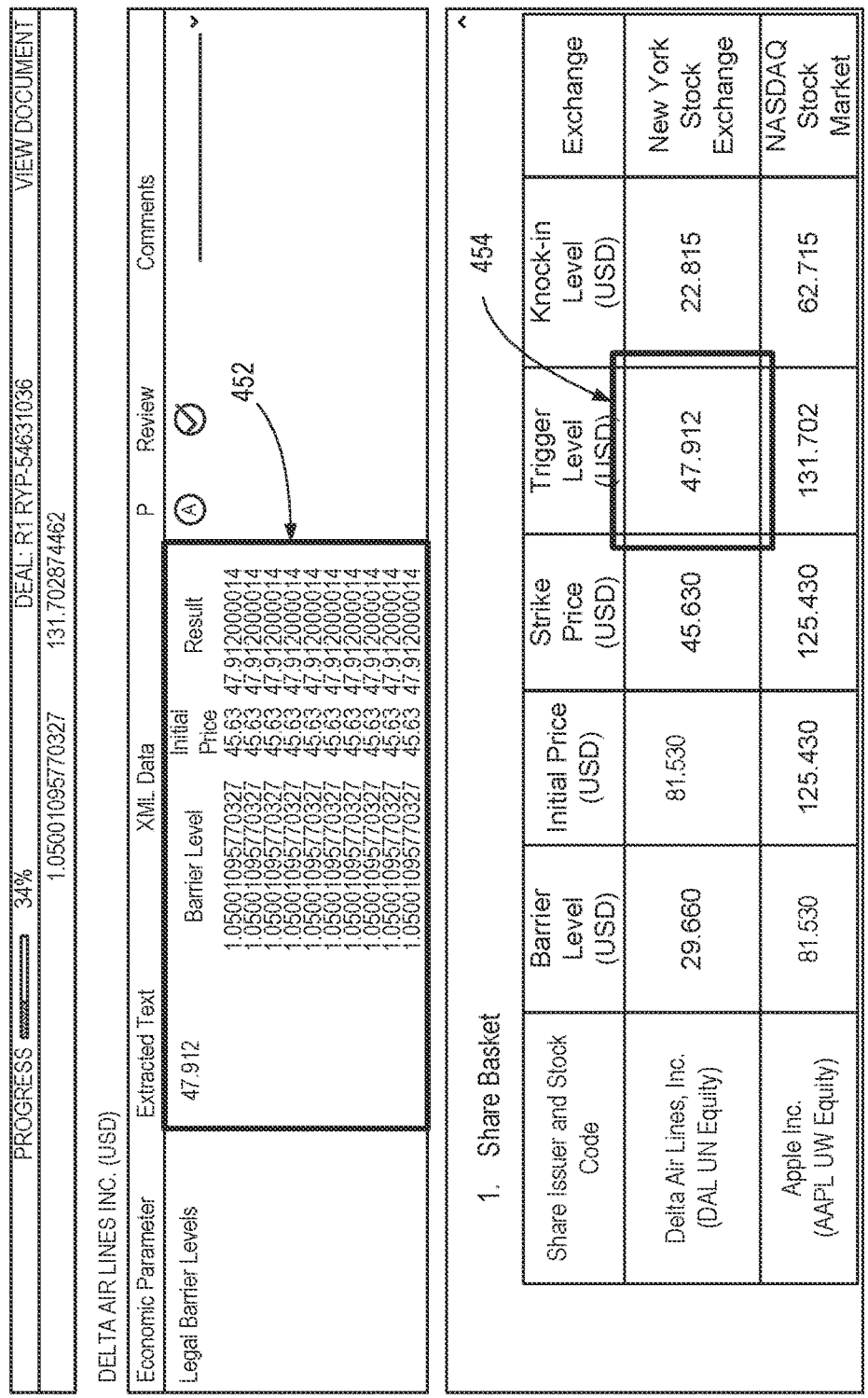
FIG. 4C illustrates a screenshot of an example validation page that enables the comparison of extracted deal data to original source documents, according to one embodiment.

FIG. 4C illustrates a screenshot of an example validation page 450 that enables the comparison of extracted deal data to original source documents. In some examples, XML data 452 may be extracted from source documents 454. This example validation page enables the visual comparison of XML data 452 extracted from source documents 454 to the original source documents 454. In other examples, data from source documents may be extracted to a plurality of data formats, which can then be visually compared. In some examples, machine learning, artificial intelligence, and/or other techniques may be used to compare results.

FIG. 5 illustrates an example of a screenshot 500 of a user interface that supports techniques for predictive analysis in accordance with aspects of the present disclosure. The screenshot 500 may be an example of an output of the user interface 114 described with reference to FIG. 1.

The screenshot 500 may illustrate the validation parameters 502 generated using the predictive analysis, the disposition parameters 504, and a button 506 that allows the user to view the source files (e.g., contract document 102 or the repository 104). The validation parameters 502 and the disposition parameters may be positioned adjacent to one another to allow the user to quickly determine what needs to be reviewed and what level of review may be advisable to apply.

Figure 6:
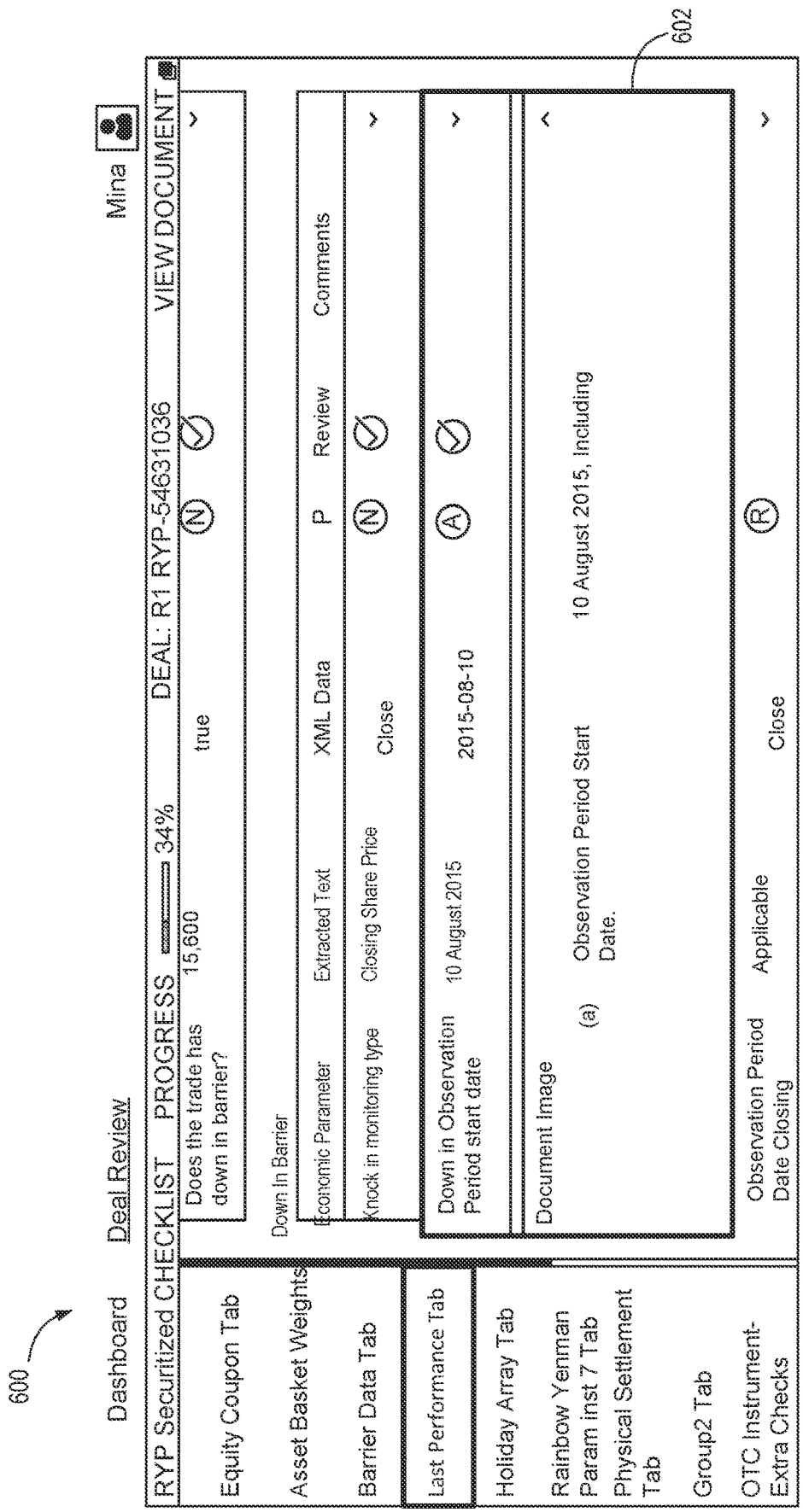
FIG. 6 illustrates an example of a screenshot of a user interface that supports techniques for predictive analysis, according to one embodiment.

FIG. 6 illustrates an example of a screenshot 600 of a user interface that supports techniques for predictive analysis in accordance with aspects of the present disclosure. The screenshot 600 may be an example of an output of the user interface 114 described with reference to FIG. 1.

The screenshot 600 may illustrate a side-by-side comparison 602 of a contract term extracted from the contract document 102 and a contract term extracted from the repository 104. The side-by-side comparison 602 may be initially hidden to allow the user to easily navigate the user interface. The side-by-side comparison 602 may appear or be expanded based on the user clicking on the item that represents the compared contract terms.

Figure 7A:
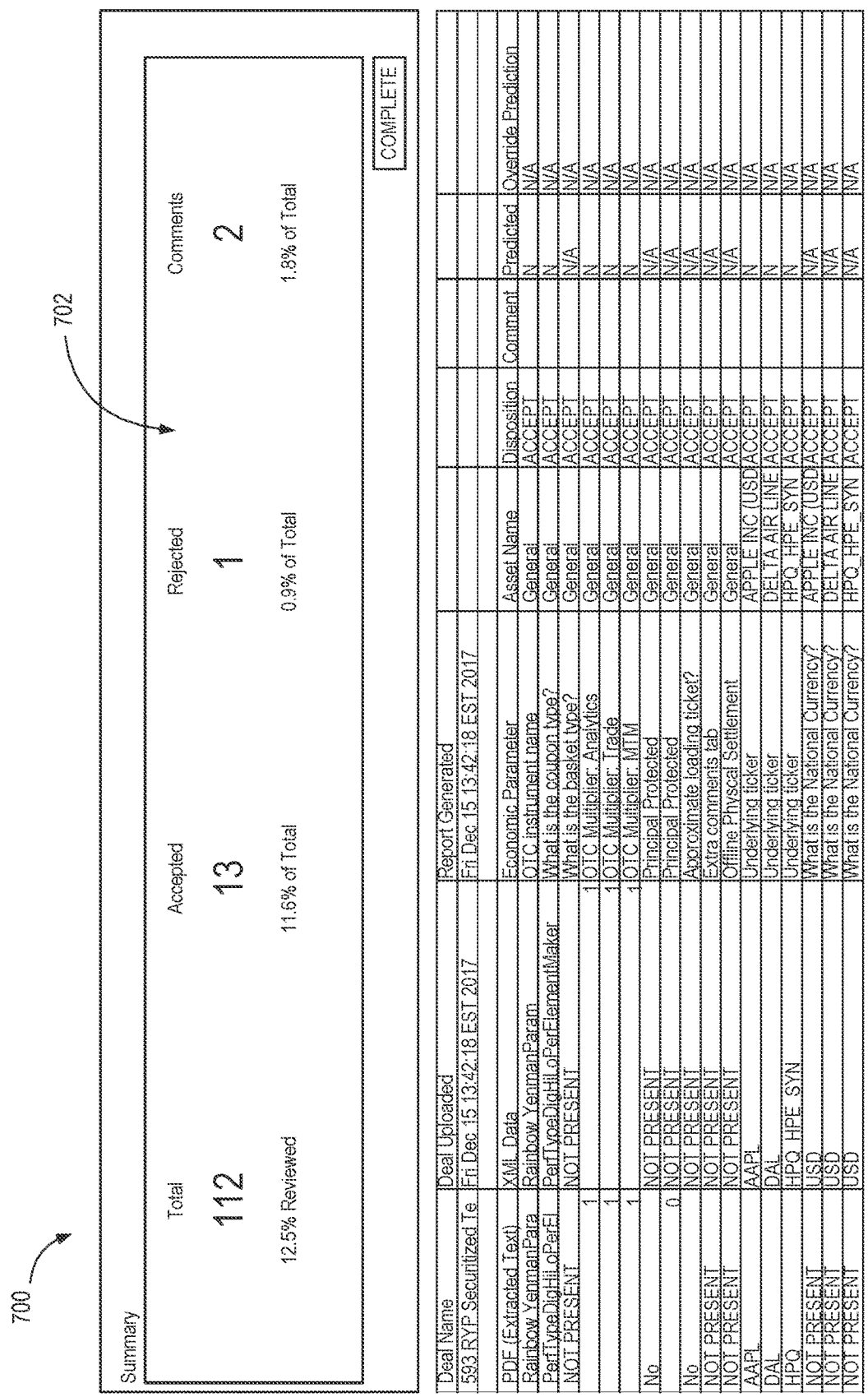
FIG. 7A illustrates an example of a screenshot of a user interface that supports techniques for predictive analysis, according to one embodiment.

FIG. 7A illustrates an example of a screenshot 700 of a user interface that supports techniques for predictive analysis in accordance with aspects of the present disclosure. The screenshot 700 may be an example of an output of the user interface 114 described with reference to FIG. 1.

The screenshot 700 may illustrate an example of a report 702 of the deal review. The report 702 may be output using, for example, the user interface. The report 702 may include a variety of information such as the predicted validation parameter, whether the predicted validation parameter was overridden by the user, the disposition parameter, and other information. The report 702 may also include a summary of the validation parameters (both predicted and/or manually entered).

FIG. 7B illustrates an example screenshot of an audit report 710 that may be made available from a user dashboard. In this example, a variety of information may be available from the audit report 710 regarding a deal. For example, the audit report 710 may comprise a deal name 712, deal uploaded 714 date, report generated 716 date, PDF extracted text 718, XML data 720, economic parameter 722, asset name 724, disposition 726, comment 728, predicted 730, and/or override prediction 732. In some examples, each item of information on an audit report 710 may be expanded to reveal additional information and/or original deal document content.

Figure 7C:
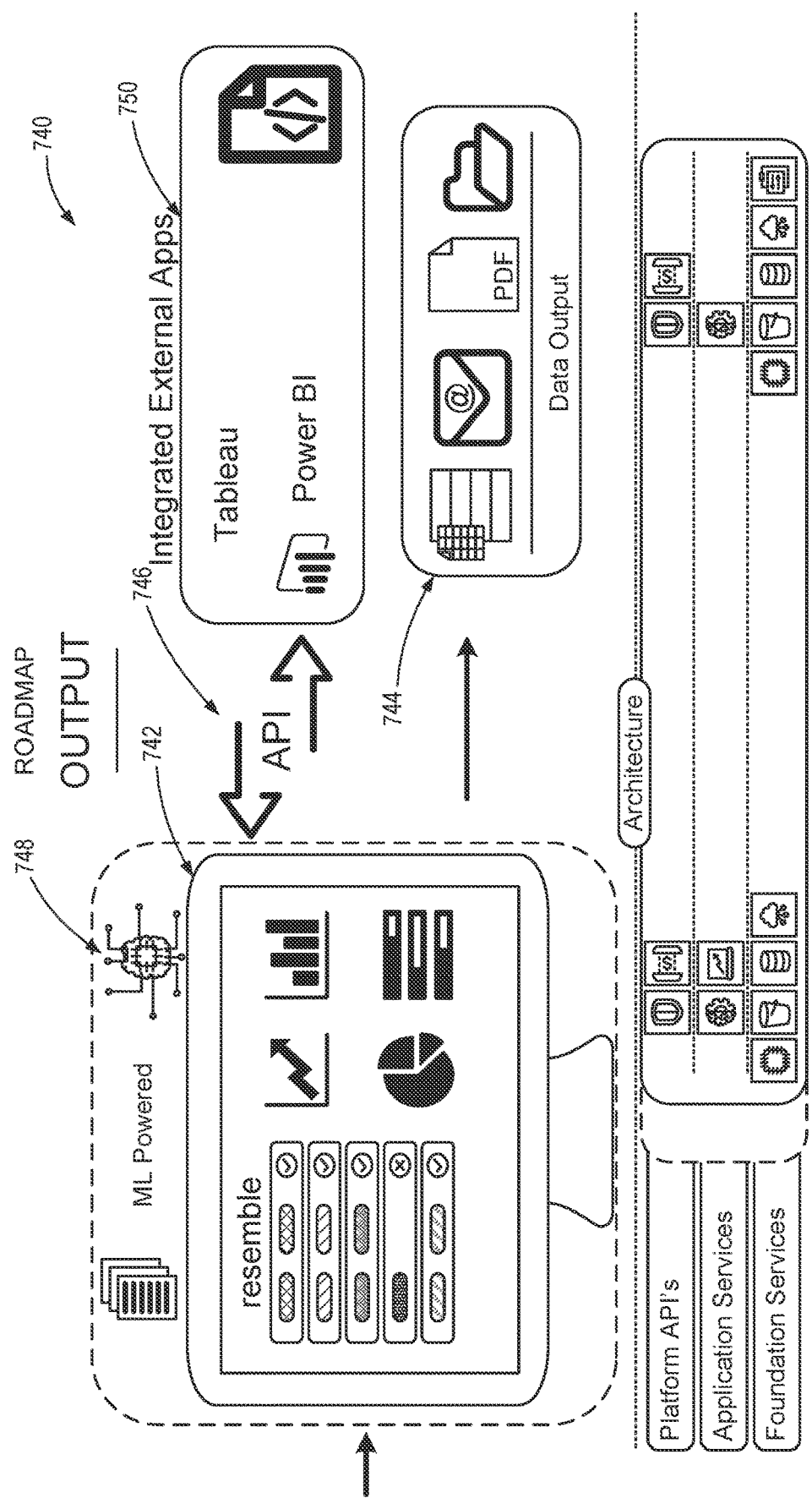
FIG. 7C illustrates an example of a deal output subsystem utilizing machine learning, according to one embodiment.

FIG. 7C illustrates an example of a deal output subsystem 740 utilizing machine learning. In some examples, there is a user interface dashboard 742 where a user may select a data output 744 format and/or one or more API integrations 746 to external applications 750. In some examples, a machine learning subsystem 748 may assist a user in their selection of data output 744 formats and/or API integrations 746.

Figure 8:
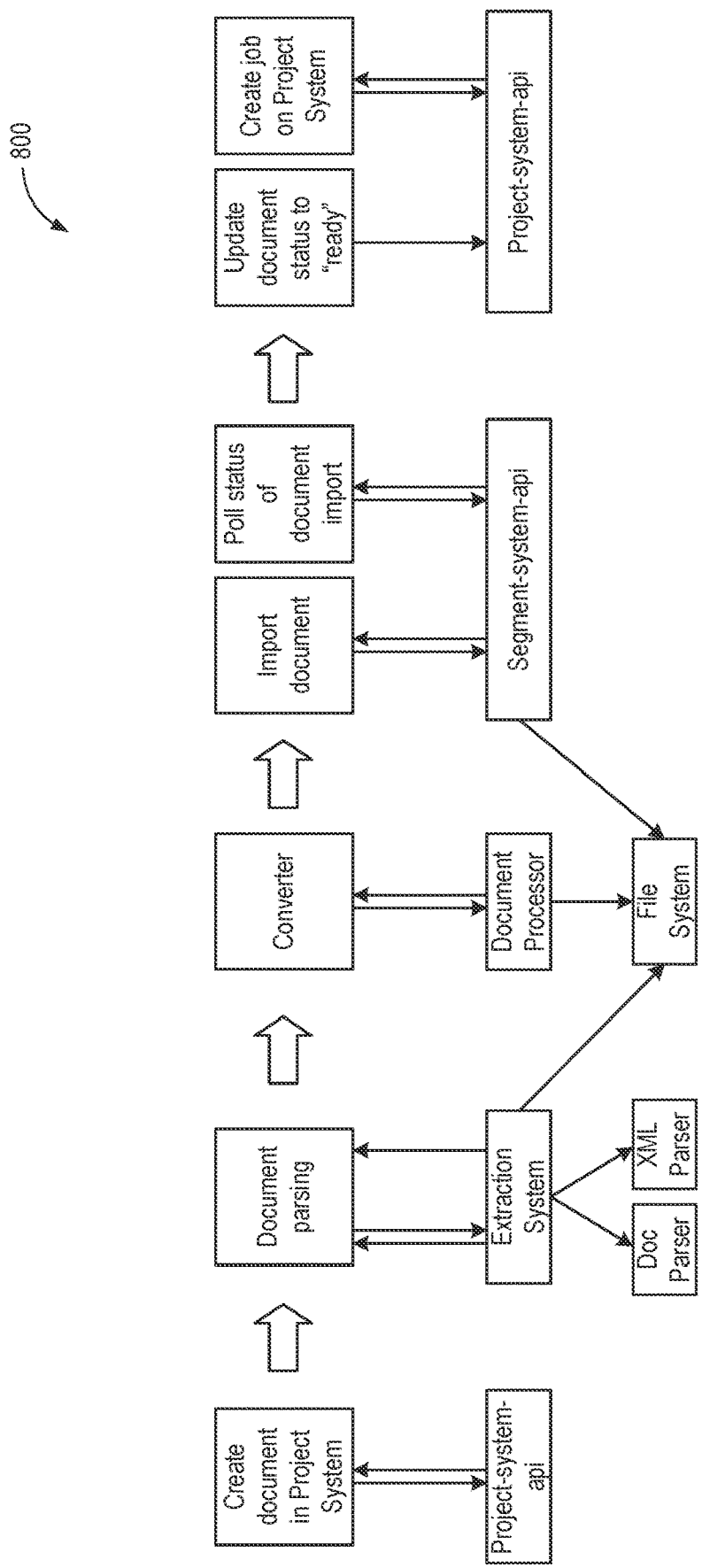
FIG. 8 illustrates an example of a block diagram of portions of a predictive analysis system, according to one embodiment.

FIG. 8 illustrates an example of a workflow 800 that supports techniques for predictive analysis in accordance with aspects of the present disclosure. The workflow 800 may illustrate a setup workflow configured to get the deal review ready for the comparative analysis. The workflow 800 includes one or more APIs and illustrates communications between different functional blocks.

Figure 9:
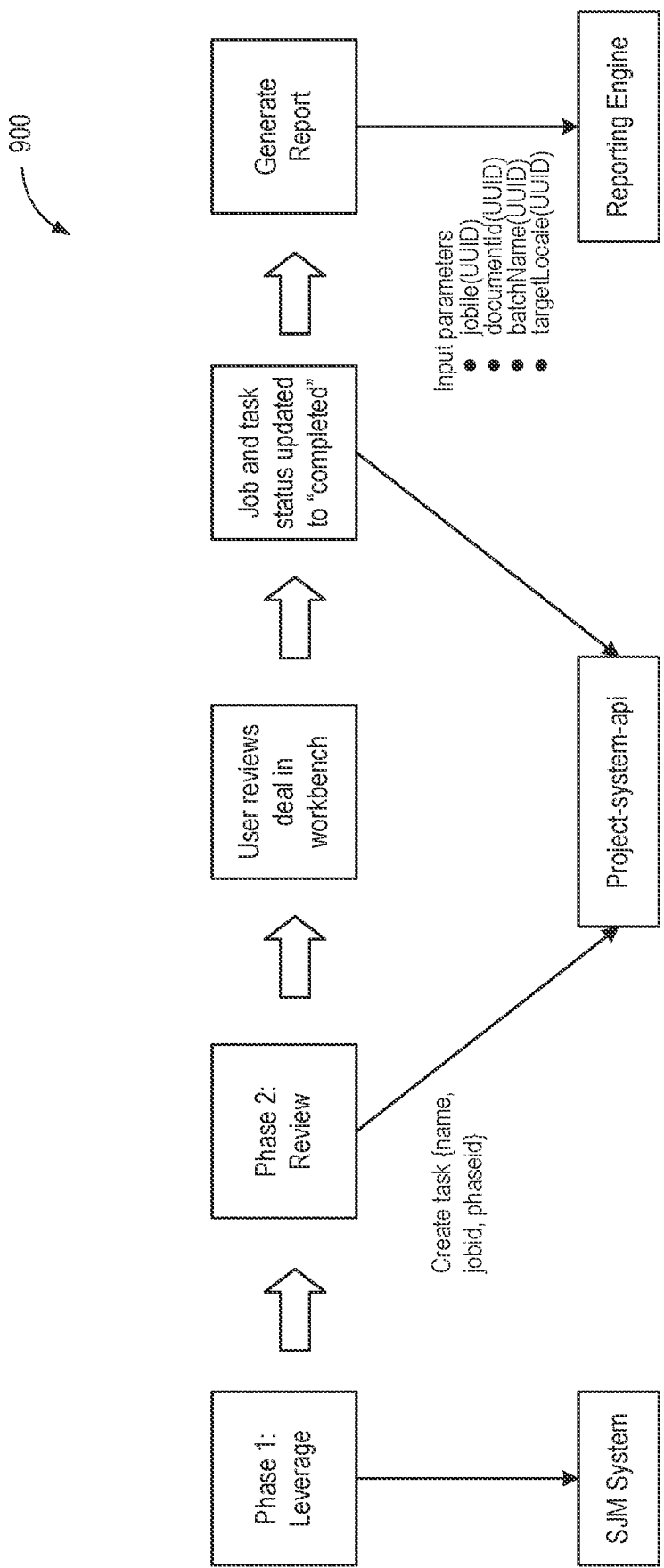
FIG. 9 illustrates an example of a block diagram of portions of a predictive analysis system, according to one embodiment.

FIG. 9 illustrates an example of a workflow 900 that supports techniques for predictive analysis in accordance with aspects of the present disclosure. The workflow 900 may illustrate a translation workflow configured to apply the comparative analysis and other operations to the compared contract terms. The workflow 900 includes one or more APIs and illustrates communications between different functional blocks.

Figure 10:
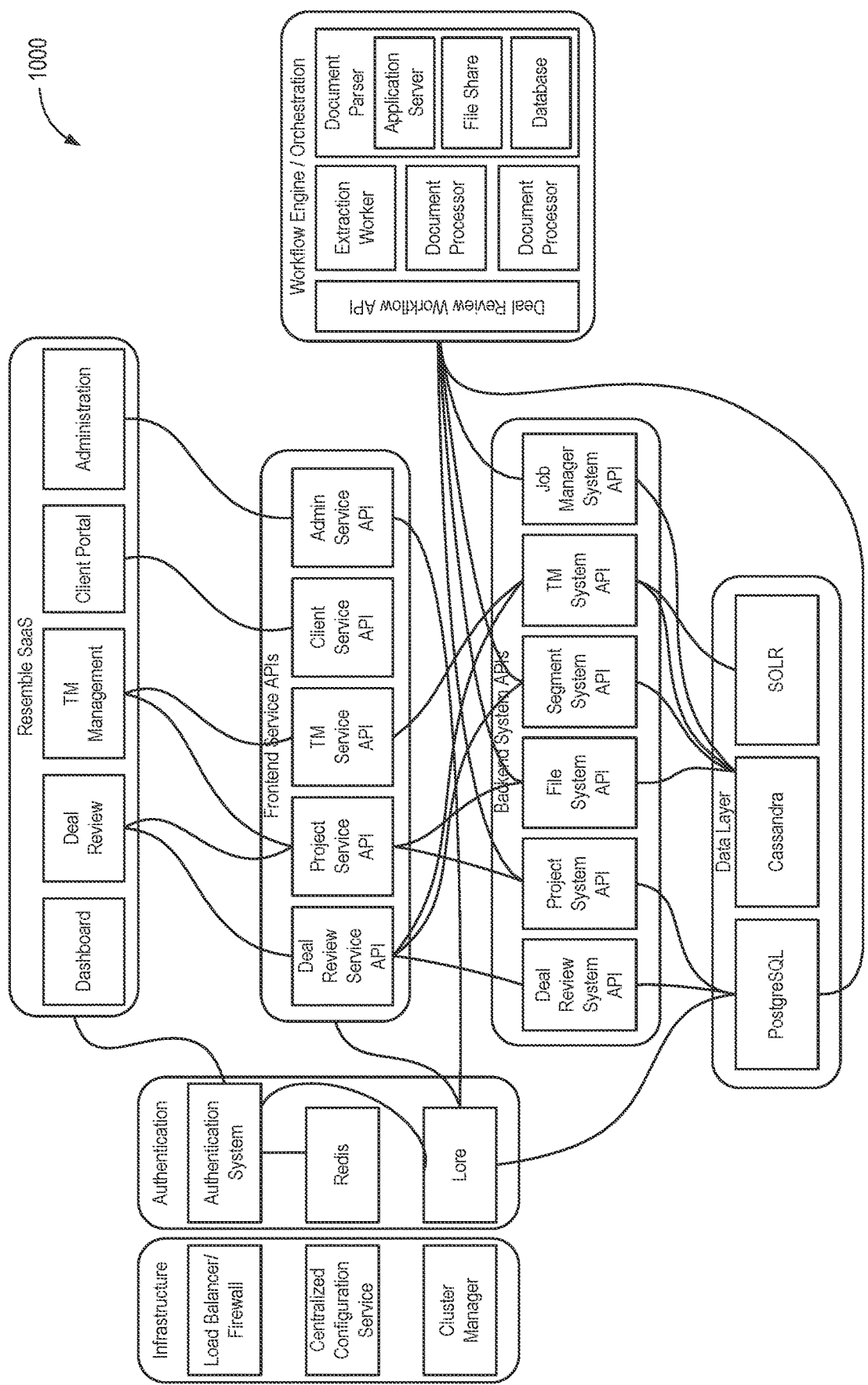
FIG. 10 illustrates an example of a block diagram of portions of a predictive analysis system, according to one embodiment.

FIG. 10 illustrates an example of a diagram 1000 that supports techniques for predictive analysis in accordance with aspects of the present disclosure. The diagram 1000 may illustrate an environment for executing the procedures described herein. The diagram 1000 may illustrate engines, APIs, other structures, and relationships between those structures.

Figure 11:
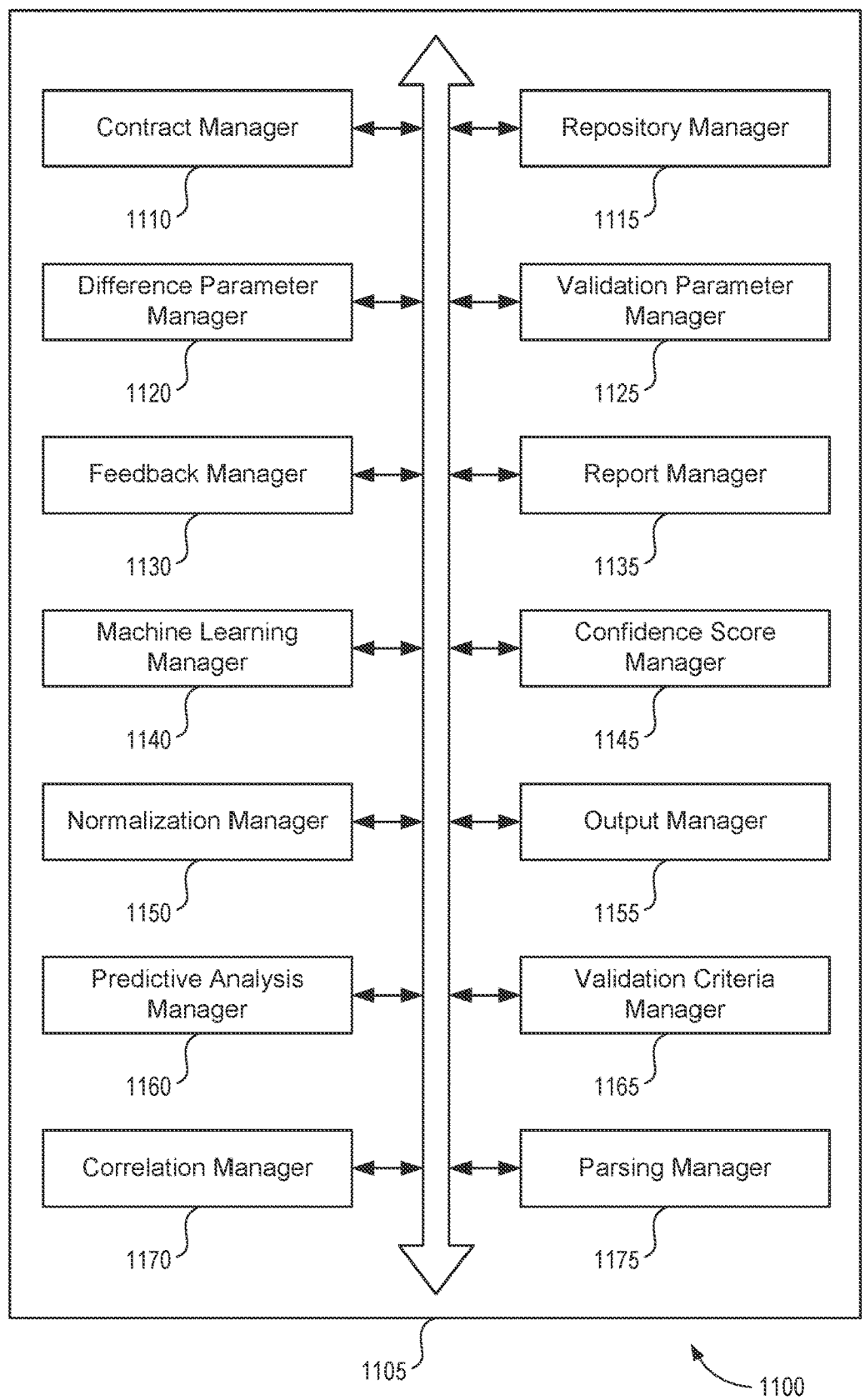
FIG. 11 shows a block diagram of a deal review manager that supports techniques for predictive analysis, according to one embodiment.

FIG. 11 shows a block diagram 1100 of a deal review manager 1105 that supports techniques for predictive analysis in accordance with aspects of the present disclosure. The deal review manager 1105 may be an example of aspects of a deal review manager 1210 described herein. The deal review manager 1105 may include a contract manager 1110, a repository manager 1115, a difference parameter manager 1120, a validation parameter manager 1125, a feedback manager 1130, a report manager 1135, a machine learning manager 1140, a confidence score manager 1145, a normalization manager 1150, an output manager 1155, a predictive analysis manager 1160, a validation criteria manager 1165, a correlation manager 1170, and a parsing manager 1175. Each of these modules may communicate, directly or indirectly, with one another (e.g., via one or more buses).

The contract manager 1110 may, for example, extract a first contract term from a contract document. In some cases, the contract document includes a portable data format (PDF) document.

The repository manager 1115 may, for example, extract a second contract term from a repository of contract terms based on the first contract term extracted from the contract document. In some cases, the repository of contract terms includes XML data.

The difference parameter manager 1120 may, for example, identify a difference parameter between the first contract term extracted from the contract document and the second contract term extracted from the repository of contract terms. In some examples, the difference parameter manager 1120 may determine whether the difference parameter between the first contract term and the second contract term satisfies a threshold using a predictive analysis. In some examples, the difference parameter manager 1120 may identify that a second difference parameter between validated contract terms is similar to the difference parameter between the first contract term and the second contract term, where the second difference parameter is selected from a database of past validated contract terms. In some examples, the difference parameter manager 1120 may identify a second validation parameter associated with the second difference parameter, where determining the validation parameter using the predictive analysis is based on identifying the second validation parameter associated with the second difference parameter.

The validation parameter manager 1125 may, for example, generate a validation parameter based on determining whether the difference parameter satisfies the threshold, where the validation parameter indicates a level of acceptability of a difference between the first contract term and the second contract term.

The feedback manager 1130 may, for example, request feedback from a user to validate the validation parameter generated using the predictive analysis. In some examples, the feedback manager 1130 may receive the feedback from the user. In some examples, the feedback manager 1130 may receive the feedback from the user that the validation parameter generated using the predictive analysis is incorrect. In some examples, the feedback manager 1130 may modify the validation parameter based on receiving the feedback from the user. In some examples, the feedback manager 1130 may receive one or more comments from the user regarding the difference parameter based on requesting the feedback from the user.

The report manager 1135 may, for example, generate a report indicating the first contract term, the second contract term, the validation parameter, and the feedback from the user that validated the validation parameter. In some cases, the report includes a first set of contract terms extracted from the contract document, a second set of terms extracted from the repository of contract terms, and a set of validation parameters associated with the first set of contract terms and the second set of contract terms.

The machine learning manager 1140 may, for example, store the difference parameter between the first contract term and the second contract term, the validation parameter, and the feedback from the user in a database. In some examples, the machine learning manager 1140 may perform machine learning on information stored in the database to adjust results of the predictive analysis, where generating the validation parameter using the predictive analysis is based on performing the machine learning.

The confidence score manager 1145 may, for example, generate a confidence score associated with the validation parameter generated using the predictive analysis that indicates a likelihood that the validation parameter is correct for the difference parameter between the first contract term and the second contract term, where requesting the feedback from the user is based on generating the confidence score.

The normalization manager 1150 may, for example, normalize the first contract term or the second contract term. In some examples, the normalization manager 1150 may output the normalized first contract term or the normalized second contract term to the user, where requesting the feedback from the user is based on outputting the normalized first contract term or the normalized second contract term to the user.

The output manager 1155 may output to the user the first contract term, the second contract term, the validation parameter, a confidence score, or a disposition parameter, or a combination thereof, where requesting the feedback from the user is based on the outputting.

The predictive analysis manager 1160 may, for example, apply the predictive analysis to the difference parameter, the first contract term, the second contract term, or a combination thereof, where generating the validation parameter is based on applying the predictive analysis. In some examples, the predictive analysis manager 1160 may compare the difference parameter to one or more difference parameters of validated contract terms stored in a database, where determining whether the difference parameter satisfies the threshold is based on the comparison. In some examples, the predictive analysis manager 1160 may perform one or more risk evaluations on the difference parameter, where determining whether the difference parameter satisfies the threshold is based on performing the one or more risk evaluations. In some cases, the threshold is an acceptance threshold, a validation threshold, a rejection threshold, a no prediction threshold, or a combination thereof.

The validation criteria manager 1165 may, for example, identify a set of validation criteria to apply to the first contract term, the second contract term, or the difference parameter, or a combination thereof. In some examples, the validation criteria manager 1165 may apply the set of validation criteria to the difference parameter, where identifying the validation parameter is based on applying the set of validation criteria to the difference parameter. In some examples, the validation criteria manager 1165 may categorize the first contract term extracted from the contract document.

In some examples, the validation criteria manager 1165 may categorize the second contract term extracted from the repository of contract terms, where identifying the difference parameter is based on categorizing the first contract term and the second contract term. In some examples, the validation criteria manager 1165 may determine a validation criterion from a set of validation criteria to apply to the difference parameter based at least in part categorizing the first contract term and the second contract term. In some examples, the validation criteria manager 1165 may apply the validation criterion to the difference parameter, where determining whether the difference parameter satisfies the threshold is based on applying the validation criterion.

The correlation manager 1170 may, for example, correlate the first contract term extracted from the contract document with the second contract term extracted from the repository of contract terms, where identifying the difference parameter may be based on correlating the first contract term and the second contract term.

The parsing manager 1175 may, for example, parse the contract document, where identifying the first contract term may be based on parsing the contract document. In some examples, the parsing manager 1175 may parse the repository of contract terms, where identifying the second contract term is based on parsing the repository of contract terms.

Figure 12:
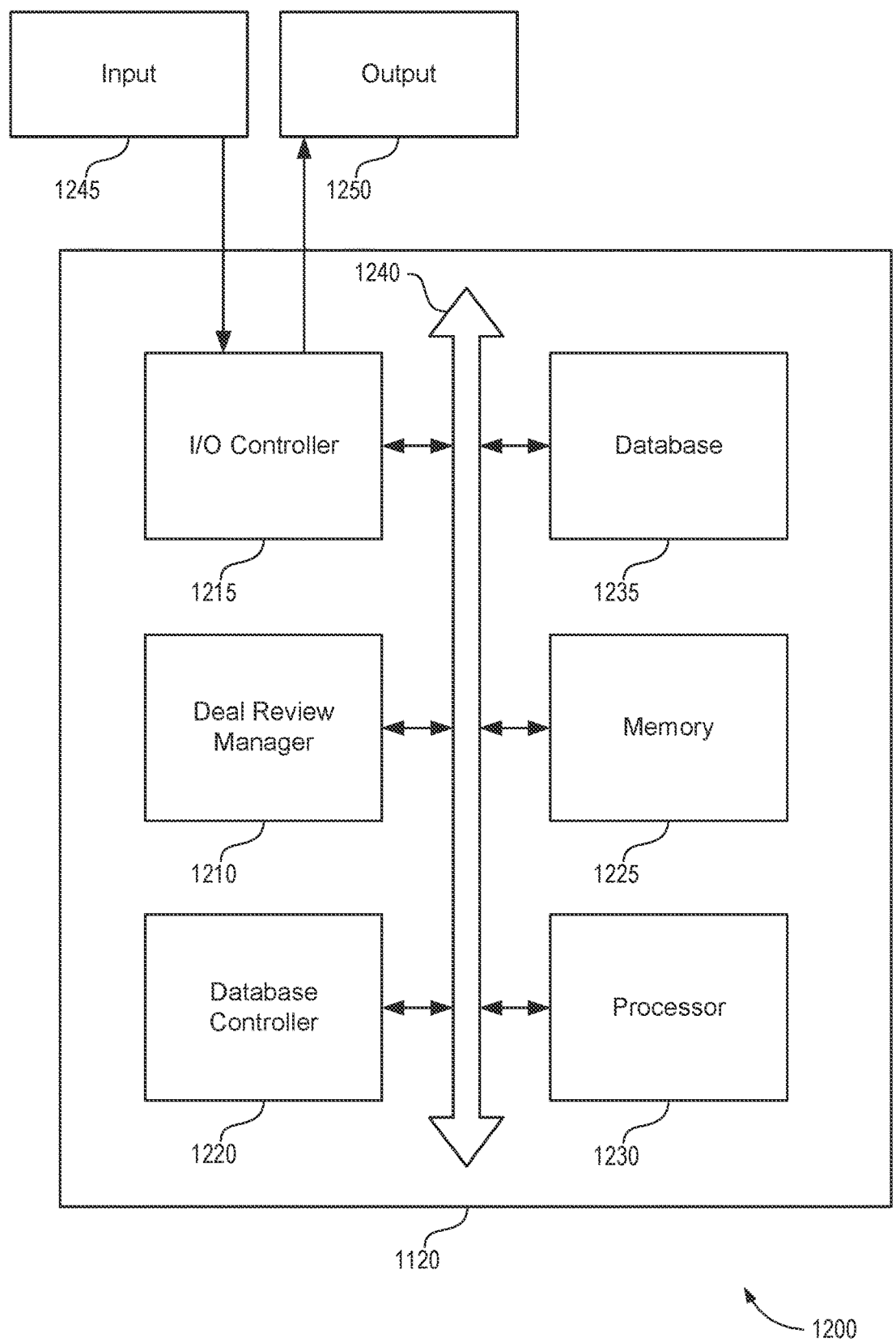
FIG. 12 shows a diagram of a block diagram of portions of a predictive analysis system, according to one embodiment.

FIG. 12 shows a diagram of a system 1200 including a device 1205 that supports techniques for predictive analysis in accordance with aspects of the present disclosure. The device 1205 may be an example of or include the components of an application server as described herein. The device 1205 may include components for bi-directional data communications including components for transmitting and receiving communications, including a deal review manager 1210, an I/O controller 1215, a database controller 1220, memory 1225, a processor 1230, and a database 1235. These components may be in electronic communication via one or more buses (e.g., bus 1240).

The deal review manager 1210 may be an example of a deal review manager 1105 as described herein. In some cases, the deal review manager 1210 may be implemented in hardware, software executed by a processor, firmware, or any combination thereof.

The I/O controller 1215 may manage input signals 1245 and output signals 1250 for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The database controller 1220 may manage data storage and processing in a database 1235. In some cases, a user may interact with the database controller 1220. In other cases, the database controller 1220 may operate automatically without user interaction. The database 1235 may be an example of a single database, a distributed database, multiple distributed databases, a data store, a data lake, or an emergency backup database.

Memory 1225 may include random-access memory (RAM) and read-only memory (ROM). The memory 1225 may store computer-readable, computer-executable software including instructions that, when executed, cause the processor to perform various functions described herein. In some cases, the memory 1225 may contain, among other things, a basic input/output system (BIOS) which may control basic hardware or software operation such as the interaction with peripheral components or devices.

The processor 1230 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1230 may be configured to operate a memory array using a memory controller. In other cases, a memory controller may be integrated into the processor 1230. The processor 1230 may be configured to execute computer-readable instructions stored in a memory 1225 to perform various functions (e.g., functions or tasks supporting techniques for predictive analysis).

Figure 13:
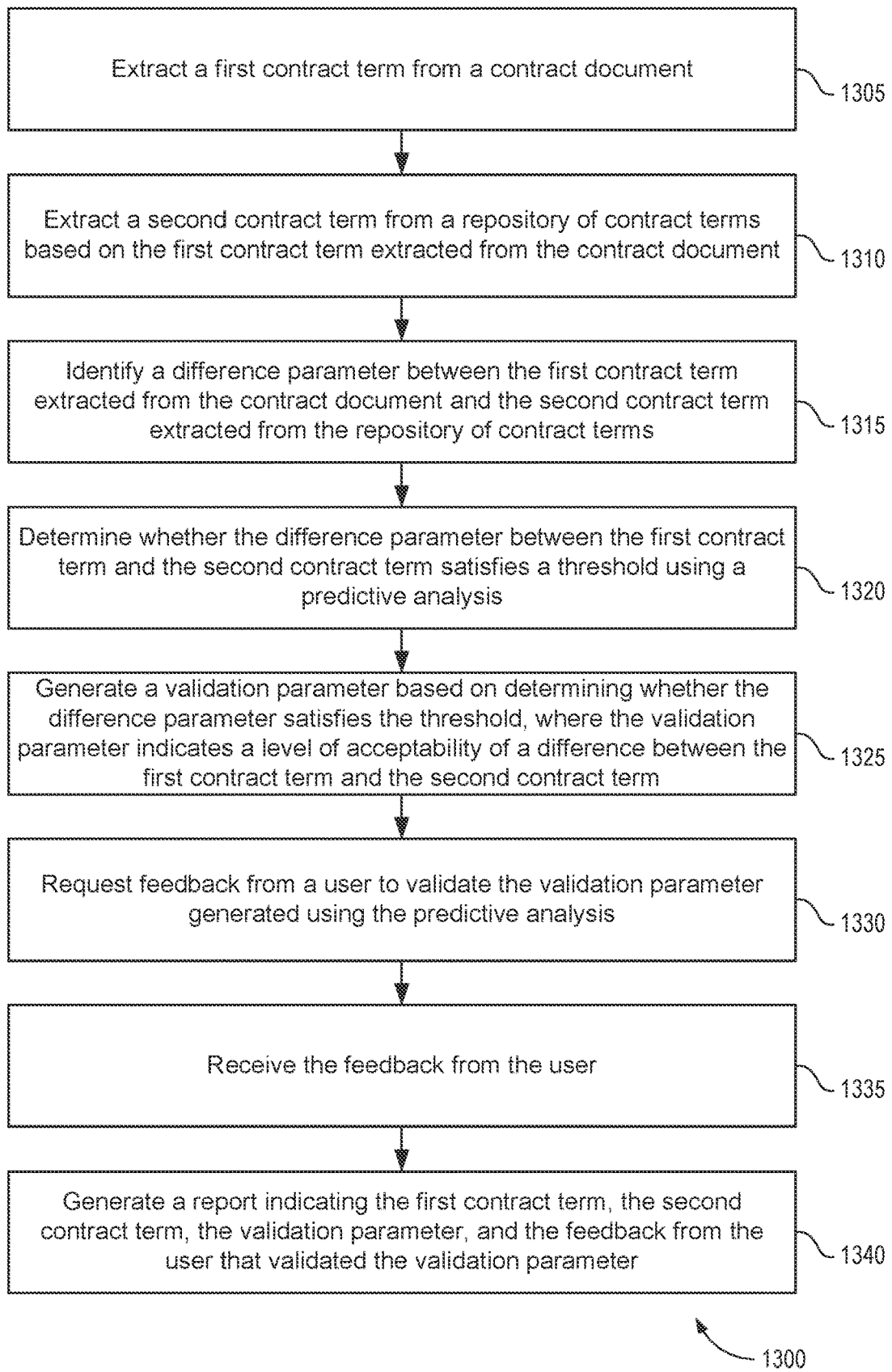
FIG. 13 shows a flowchart illustrating a method implementable by a predictive analysis system, according to one embodiment.

FIG. 13 shows a flowchart illustrating a method 1300 that supports techniques for predictive analysis in accordance with aspects of the present disclosure. The operations of method 1300 may be implemented by an application server or its components as described herein. For example, the operations of method 1300 may be performed by a deal review manager as described with reference to FIGS. 11 through 12. In some examples, an application server may execute a set of instructions to control the functional elements of the application server to perform the functions described below. Additionally or alternatively, an application server may perform aspects of the functions described below using special-purpose hardware.

At 1305, the application server may extract a first contract term from a contract document. In some examples, aspects of the operations of 1305 may be performed by a contract manager as described with reference to FIGS. 11 through 12.

At 1310, the application server may extract a second contract term from a repository of contract terms based on the first contract term extracted from the contract document. In some examples, aspects of the operations of 1310 may be performed by a repository manager as described with reference to FIGS. 11 through 12.

At 1315, the application server may identify a difference parameter between the first contract term extracted from the contract document and the second contract term extracted from the repository of contract terms. In some examples, aspects of the operations of 1315 may be performed by a difference parameter manager as described with reference to FIGS. 11 through 12.

At 1320, the application server may determine whether the difference parameter between the first contract term and the second contract term satisfies a threshold using a predictive analysis. In some examples, aspects of the operations of 1320 may be performed by a difference parameter manager as described with reference to FIGS. 11 through 12.

At 1325, the application server may generate a validation parameter based on determining whether the difference parameter satisfies the threshold, where the validation parameter indicates a level of acceptability of a difference between the first contract term and the second contract term. In some examples, aspects of the operations of 1325 may be performed by a validation parameter manager as described with reference to FIGS. 11 through 12.

At 1330, the application server may request feedback from a user to validate the validation parameter generated using the predictive analysis. In some examples, aspects of the operations of 1330 may be performed by a feedback manager as described with reference to FIGS. 11 through 12.

At 1335, the application server may receive the feedback from the user. In some examples, aspects of the operations of 1335 may be performed by a feedback manager as described with reference to FIGS. 11 through 12.

At 1340, the application server may generate a report indicating the first contract term, the second contract term, the validation parameter, and the feedback from the user that validated the validation parameter. In some examples, aspects of the operations of 1340 may be performed by a report manager as described with reference to FIGS. 11 through 12.

The method described above describes possible implementations, and the operations and the steps may be rearranged or otherwise modified and that other implementations are possible. Any of the methods may be implemented by corresponding hardware, electronic circuitry, computer-executable instructions, and/or a combination thereof. Accordingly, each operation, step, and functionality may be performed by a "module" with a name corresponding to its function that may be implemented as hardware, software, and/or firmware. For example, a system may include a term extraction module to extract a first contract term from a contract document. The term extraction module may extract a second contract term from a repository of contract terms based at least in part on the first contract term extracted from the contract document. The system may further include a comparison module to identify a difference parameter between the first contract term extracted from the contract document and the second contract term extracted from the repository of contract terms.

The comparison module may further determine whether the difference parameter between the first contract term and the second contract term satisfies a threshold based on a predictive analysis model. The system may also include a validation module to identify a validation parameter based on the determination of whether the difference parameter satisfies the threshold, wherein the validation parameter indicates a quantified level of acceptability of a difference between the first contract term and the second contract term. The system may also include a feedback module to receive feedback from a user to validate the validation parameter that was generated using the predictive analysis model.

The system may also include a predictive analysis module to dynamically modify the predictive analysis module when the received feedback indicates that the comparison module assigned an incorrect difference parameter. The system may also include a report module to generate a report indicating the first contract term, the second contract term, the validation parameter, and the feedback from the user.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media, including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference labels.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein and to encompass the claims presented in the provisional application to which this application claims priority and to the claims presented below.

What is claimed is:

1. A system, comprising:
   a term extraction module to:
     extract a first term from a document, and
     extract a second term from a repository of terms based at least in part on the first term extracted from the document;
   a comparison module to:
     identify a difference parameter between the first term extracted from the document and the second term extracted from the repository of terms, and
     determine whether the difference parameter between the first term and the second term satisfies a threshold based on a predictive analysis model;
   a validation module to identify a validation parameter based on the determination of whether the difference parameter satisfies the threshold based on the predictive analysis model, wherein the validation parameter indicates a quantified level of acceptability of a difference between the first term and the second term;
   a feedback module to receive feedback from a user to validate the validation parameter generated using the predictive analysis model; and
   a predictive analysis module to dynamically modify the predictive analysis model when the received feedback indicates that the comparison module assigned an incorrect difference parameter.

2. The system of claim 1, wherein the document comprises one or more of a deal document, a contract document, a transaction document, a negotiation document, an agreement document, and a legal document.

3. The system of claim 1, further comprising:
   a database to store the difference parameter between the first term and the second term, the validation parameter, and the feedback from the user; and
   a machine learning manager to perform machine learning on information stored in the database to adjust the predictive analysis model, and wherein subsequent validation parameters generated by the validation module are generated based on the adjusted predictive analysis model.

4. The system of claim 1, further comprising a confidence score manager to generate a confidence score associated with the validation parameter using the predictive analysis model that indicates a likelihood that the validation parameter is correct for the difference parameter between the first term and the second term, and
   wherein the feedback module requests the feedback from the user at least partially in response to the generated confidence score.

5. The system of claim 1, wherein the predictive analysis module is further configured to implement a validated difference parameter comparison in which the difference parameter is compared to one or more difference parameters of validated terms stored in a database, and
   wherein the comparison module is configured to determine whether the difference parameter satisfies the threshold based, at least in part, on the validated difference parameter comparison.

6. The system of claim 1, wherein the predictive analysis module is configured to determine a risk profile of the difference parameter based on a risk evaluation of the difference parameter, and
   wherein the comparison module is configured to determine whether the difference parameter satisfies the threshold based, at least in part, on the determined risk profile of the difference parameter.

7. The system of claim 1, wherein the threshold is an acceptance threshold, a validation threshold, a rejection threshold, a no-prediction threshold, or a combination thereof.

8. A system, comprising:
   a term extraction module to:
     extract a first term from a first document, and
     extract a second term from a second document based at least in part on the first term extracted from the first document;
   a comparison module to:
     identify a difference parameter between the first term extracted from the first document and the second term extracted from the second document, and
     determine whether the difference parameter between the first term and the second term satisfies a threshold based on a predictive analysis model;
   a validation module to identify a validation parameter based on the determination of whether the difference parameter satisfies the threshold based on the predictive analysis model, wherein the validation parameter indicates a quantified level of acceptability of a difference between the first term and the second term;
   a feedback module to receive feedback from a user to validate the validation parameter generated using the predictive analysis model; and
   a predictive analysis module to dynamically modify the predictive analysis model when the received feedback indicates that the comparison module assigned an incorrect difference parameter.

9. The system of claim 8, wherein the first document comprises one or more of a deal document, a contract document, a transaction document, a negotiation document, an agreement document, and a legal document.

10. The system of claim 8, further comprising a data repository to hold a plurality of documents, and
    wherein the term extraction module retrieves the second term from the second document from within the data repository.

11. A non-transitory computer-readable medium storing code, the code comprising instructions executable by a processor to:
    extract a first term from a document;
    extract a second term from a repository of terms based at least in part on the first term extracted from the document;

determine a difference parameter based on a difference between the first term extracted from the document and the second term extracted from the repository of terms;

determine whether the difference parameter satisfies a threshold using a predictive analysis model;

generate a validation parameter that indicates a level of acceptability of a difference between the first term and the second term;

request feedback from a user to validate the validation parameter generated using the predictive analysis model;

receive the feedback from the user indicating that the predictive analysis model is incorrect based on the validation parameter assigned to the difference between the first term and the second term; and update the predictive analysis model based on the feedback from the user.

12. The non-transitory computer-readable medium of claim 11, wherein the document comprises one or more of a deal document, a contract document, a transaction document, a negotiation document, an agreement document, and a legal document.

13. A non-transitory computer-readable medium storing code, the code comprising instructions executable by a processor to:

extract a first term from a first document;

extract a second term from a second document based at least in part on the first term extracted from the first document;

determine a difference parameter based on a difference between the first term extracted from the first document and the second term extracted from the second document;

determine whether the difference parameter satisfies a threshold using a predictive analysis model;

generate a validation parameter that indicates a level of acceptability of a difference between the first term and the second term;

request feedback from a user to validate the validation parameter generated using the predictive analysis model;

receive the feedback from the user indicating that the predictive analysis model is incorrect based on the validation parameter assigned to the difference between the first term and the second term; and update the predictive analysis model based on the feedback from the user.

14. The non-transitory computer-readable medium of claim 13, wherein the first document comprises one or more of a deal document, a contract document, a transaction document, a negotiation document, an agreement document, and a legal document.

15. The non-transitory computer-readable medium of claim 13, wherein the instructions executable by the processor to extract the second term from the second document comprise extracting the second document from a data repository of a plurality of documents.

16. The non-transitory computer-readable medium of claim 13, wherein the instructions are further executable to:

store the difference parameter between the first term and the second term, the validation parameter, and the feedback from the user in a database; and perform machine learning on information stored in the database to adjust results of the predictive analysis model, wherein generating the validation parameter using the predictive analysis model is based at least in part on performing the machine learning.

17. The non-transitory computer-readable medium of claim 13, wherein the instructions are further executable to:

categorize the first term extracted from the first document; and categorize the second term extracted from the second document, wherein identifying the difference parameter is based at least in part on the categorizations of the first term and the second term.

18. The non-transitory computer-readable medium of claim 17, wherein the instructions are further executable to:

determine a validation criterion from a set of validation criteria to apply to the difference parameter based at least in part categorizing the first term and the second term; and apply the validation criterion to the difference parameter, wherein determining whether the difference parameter satisfies the threshold is based at least in part on applying the validation criterion.

19. The non-transitory computer-readable medium of claim 13, wherein the instructions are further executable to:

identify that a second difference parameter between validated terms is similar to the difference parameter between the first term and the second term, wherein the second difference parameter is selected from a database of past validated terms; and identify a second validation parameter associated with the second difference parameter, wherein determining the validation parameter using the predictive analysis model is based at least in part on identifying the second validation parameter associated with the second difference parameter.

20. The non-transitory computer-readable medium of claim 13, wherein the instructions are further executable to:

correlate the first term extracted from the first document with the second term extracted from the second document, wherein identifying the difference parameter is based at least in part on correlating the first term and the second term.

\* \* \* \* \*